United States Patent
Chun et al.

(10) Patent No.: US 10,207,242 B2
(45) Date of Patent: Feb. 19, 2019

(54) ALUMINA FORMING REFINERY PROCESS TUBES WITH MIXING ELEMENT

(71) Applicants: Changmin Chun, Annandale, NJ (US); David B. Spicer, Houston, TX (US)

(72) Inventors: Changmin Chun, Annandale, NJ (US); David B. Spicer, Houston, TX (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 639 days.

(21) Appl. No.: 14/942,045

(22) Filed: Nov. 16, 2015

(65) Prior Publication Data

US 2016/0167009 A1    Jun. 16, 2016

Related U.S. Application Data

(60) Provisional application No. 62/199,357, filed on Jul. 31, 2015, provisional application No. 62/092,616, filed on Dec. 16, 2014.

(51) Int. Cl.

| | | |
|---|---|---|
| *B01J 19/02* | (2006.01) | |
| *C01B 3/34* | (2006.01) | |
| *C10G 9/20* | (2006.01) | |
| *C22C 19/05* | (2006.01) | |
| *C22C 38/44* | (2006.01) | |
| *B01J 19/00* | (2006.01) | |
| *B01J 19/24* | (2006.01) | |
| *B01J 3/06* | (2006.01) | |
| *B23K 10/02* | (2006.01) | |
| *C22C 30/00* | (2006.01) | |
| *F28F 21/08* | (2006.01) | |
| *B01F 5/06* | (2006.01) | |
| *F28F 19/00* | (2006.01) | |
| *F28D 21/00* | (2006.01) | |
| *B23K 103/10* | (2006.01) | |

(52) U.S. Cl.
CPC ............ *B01J 19/02* (2013.01); *B01J 3/062* (2013.01); *B01J 19/0026* (2013.01); *B01J 19/244* (2013.01); *B01J 19/2415* (2013.01); *B01J 19/2425* (2013.01); *B23K 10/02* (2013.01); *C01B 3/34* (2013.01); *C10G 9/203* (2013.01); *C22C 19/05* (2013.01); *C22C 19/055* (2013.01); *C22C 19/056* (2013.01); *C22C 30/00* (2013.01); *C22C 38/44* (2013.01); *B01F 2005/0636* (2013.01); *B01J 2219/00099* (2013.01); *B01J 2219/00117* (2013.01); *B01J 2219/00157* (2013.01); *B01J 2219/00247* (2013.01); *B01J 2219/00252* (2013.01); *B01J 2219/00765* (2013.01); *B01J 2219/024* (2013.01); *B01J 2219/0277* (2013.01); *B23K 2103/10* (2018.08); *C01B 2203/0833* (2013.01); *F28D 2021/0059* (2013.01); *F28F 19/00* (2013.01); *F28F 21/08* (2013.01)

(58) Field of Classification Search
CPC .............. B01J 19/02; B01J 2219/00081; B01J 2219/0277; C01B 3/34; C01B 2203/0833
See application file for complete search history.

(56) References Cited

U.S. PATENT DOCUMENTS

| | | |
|---|---|---|
| 4,685,427 A | 8/1987 | Tassen et al. |
| 5,223,278 A | 6/1993 | Nicetto |
| 5,950,718 A | 9/1999 | Sugitani et al. |
| 6,409,847 B2 | 6/2002 | Kleemann |
| 6,419,885 B1 | 7/2002 | Di Nicolantonio et al. |
| 6,719,953 B2 | 4/2004 | Di Nicolantonio et al. |
| 7,799,963 B2 | 9/2010 | Inui et al. |
| 7,963,318 B2 | 6/2011 | Wolpert et al. |
| 8,431,072 B2 | 4/2013 | Muralidharan et al. |
| 8,431,230 B2 | 4/2013 | Takahashi et al. |
| 2001/0013333 A1 | 8/2001 | Takahashi et al. |
| 2012/0097289 A1 | 4/2012 | Chun et al. |
| 2012/0211400 A1 | 8/2012 | Chun et al. |
| 2014/0257001 A1 | 9/2014 | Spicer et al. |

FOREIGN PATENT DOCUMENTS

| | | |
|---|---|---|
| EP | 2037202 A1 | 3/2009 |
| EP | 2248581 A1 | 11/2010 |

OTHER PUBLICATIONS

The International Search Report and Written Opinion of PCT/US2015/060897 dated Feb. 5. 2016.
The International Search Report and Written Opinion of PCT/US2015/060929 dated Feb. 10, 2016.

*Primary Examiner* — Jessee R Roe
(74) *Attorney, Agent, or Firm* — Robert A. Migliorini; Chad A. Guice; Kristina Okafor

(57) ABSTRACT

This disclosure relates to weldments useful as heat transfer tubes in refinery processes dealing with gas phase hydrocarbon process streams at high temperatures. This disclosure also relates to tubes that are useful in refinery processes dealing with gas phase hydrocarbon process streams at high temperatures. The weldments include a tubular member and at least one mixing element. The tubular member comprises an aluminum-containing alloy. The mixing element comprises an aluminum-containing alloy. The mixing element's aluminum-containing alloy can be the same as or different from the tubular member's aluminum-containing alloy. Other aspects of the disclosure relate to refinery processes dealing with gas phase hydrocarbon process streams at high temperatures which include such weldments.

23 Claims, No Drawings

ALUMINA FORMING REFINERY PROCESS TUBES WITH MIXING ELEMENT

CROSS-REFERENCE TO RELATED APPLICATIONS

This application claims priority to U.S. Provisional Application Ser. No. 62/199,357 filed Jul. 31, 2015 and U.S. Provisional Application Ser. No. 62/092,616 filed Dec. 16, 2014, which are herein incorporated by reference in their entirety.

FIELD

The disclosure relates to tubes that are useful in refinery processes. The tubes are weldments of a tubular member and at least one mixing element. The tubular member comprises an aluminum-containing alloy. The mixing element also comprises an aluminum-containing alloy, which can be the same as or different from the tubular member's aluminum-containing alloy. The disclosure also relates to refinery process tubes, and the use of such refinery process tubes for hydrocarbon conversion processes such as syngas generation.

BACKGROUND

Syngas, or synthesis gas, is a fuel gas mixture consisting primarily of hydrogen, carbon monoxide, and very often some carbon dioxide. The name comes from its use as intermediates in manufacturing synthetic natural gas (SNG) and for producing ammonia, methanol, and synthetic petroleum for use as a fuel or lubricant via the Fischer-Tropsch process. Syngas production methods include steam reforming of natural gas or liquid hydrocarbons to produce hydrogen, the gasification of coal or biomass, and in some types of waste-to-energy gasification facilities. Historically hydrogen has been produced in catalytic reforming, as a by-product of the production of the high-octane aromatic compounds used in gasoline. Such catalytic reforming process includes fixed bed, cyclic and continuous regeneration reformers. As hydrogen use has become more widespread in refineries, hydrogen production has moved to an integral feature of most refineries. This has been made necessary by the increase in hydrotreating and hydrocracking, including the treatment of progressively heavier feedstocks. Today, where by-product hydrogen production has not been adequate, steam reforming of methane has become the dominant method for hydrogen production.

The steam methane reformer (SMR) furnace is at the heart of every syngas generation plant. In all cases, the SMR radiant section contains several hundred vertically oriented straight centrifugally cast tubes, commonly known as "reformer" or "catalyst tubes" in which reactant gases at 450-650° C. and 30-45 bar arrive through an inlet manifold, are distributed to the reformer tubes filled with catalyst, heated to 800-900° C., and then collected and delivered to the next stage of the process. The tube metal temperature will be typically in the range of 875-975° C. The best feedstocks for steam reforming are light, saturated, and low in sulfur; this includes natural gas, refinery gas, liquefied petroleum gas, and light naphtha. These feeds can be converted to hydrogen at high thermal efficiency.

Alternatively partial oxidation (POX) can be used, particularly where heavy oil is available at low cost. POX reacted hydrocarbon feed with oxygen at high temperatures to produce a mixture of hydrogen and carbon monoxide. Since the high temperature takes the place of a catalyst, POX is not limited to the light, clean feedstocks required for steam reforming. Catalytic partial oxidation, also known as autothermal reforming (ATR), reacts oxygen with a light feedstock, passing the resulting hot mixture over a reforming catalyst. Since a catalyst is used, temperatures can be lower than in noncatalytic partial oxidation, which reduces the oxygen demand. Feedstock composition requirements are similar to those for steam reforming: light hydrocarbons from refinery gas to naphtha may be used. The oxygen substitutes for much of the steam in preventing coking, so a lower steam/carbon ratio can be used. Since a large excess of steam is not required, ATR produces more CO and less hydrogen than SMR, therefore it is suited to processes where CO is desired, for example, as syngas for chemical feedstocks and for synthetic petroleum to be used as a fuel or lubricant via the Fischer-Tropsch process. Incorporating gas heated reforming (GHR) or advanced gas heated reforming (AGHR) technologies into ATR-base syngas generation process offers combined benefit of significantly higher carbon efficiency and lower capital cost. The GHR recycles high grade heat from the reformed gas directly back into the reforming process. This reduces the oxygen requirement and eliminates the need to generate large quantities of high pressure steam from the process train.

POX requires an oxygen plant, which increases syngas generation cost significantly. In most of the Fischer-Tropsch based gas conversion processes, low cost syngas generation is important to achieving competitive advantage. Many schemes have been considered to achieve this objective, and one of them is to incorporate gas-gas heat exchangers in syngas generation process. Conventional shell and tube type heat exchanger can take hot syngas stream at 450-650° C. from ATR and preheat feedstocks such as natural gas before it enters into ATR. Since the heat duty of the reformer is greatly reduced, syngas generation cost can be improved. However, in such syngas generation processes, environments are encountered that have high carbon activities and relatively low oxygen activities.

High temperature reactor materials, heat exchanger materials, and syngas process tubing and piping materials used in these processes can deteriorate in service by a very aggressive form of corrosion known as metal dusting, which also inevitably accompanies coking.

In this disclosure, refinery process is not limited to syngas generation process, but includes other hydrocarbon conversion processes dealing with gas phase hydrocarbon process streams, e.g. feedstocks, products and effluent streams, at high temperatures. Such hydrocarbon conversion processes in refinery include catalytic cracking, catalytic reforming, alkylation, dehydrogenation, hydrocracking, hydrotreating, isomerization, visbreaking and coking processes. Such hydrocarbon conversion processes also include a process suitable for converting a variety of abundant hydrocarbon resources, including coal and petcoke, into valuable liquid fuels, synthetic natural gas, chemicals and other market competitive alternatives to petroleum products. Tubular conduits, or tubes, are utilized for at least (i) conveying the hydrocarbon feed, steam, oxygen, and mixtures thereof through the furnace's convection and radiant sections, (ii) conveying product effluent away from the radiant section, (iii) conveying a decoking mixture for removing coke or decoking effluent away from the radiant section, (iv) transferring heat to the hydrocarbon feedstocks, hydrocarbon products, syngas inside the tube for the steam reforming or partial oxidation reactions, and (v) conveying syngas product streams between process equipment via transfer lines and pipes at high temperatures. Therefore, in this disclosure, the refinery process tubes include any tubular conduits used in multiple refinery processes for hydrocarbon conversion, especially syngas generation tubes dealing with gas phase hydrocarbon process streams at high temperatures.

Regardless of the refinery process for hydrocarbon conversion, the formation of coke deposits on the refinery process tubes dealing with gas phase hydrocarbon process streams at high temperatures is not desirable. Coke deposits can lead to increased pressure in the tubes due to the restriction of flow, and to higher tube wall temperatures due to the insulating effects of the coke deposits. Both higher pressure and higher temperature lead to premature failure of the tubes. Furthermore, it is often necessary to periodically remove the tube from service and remove the coke deposits by burning off the deposited coke by oxidation with air, steam, and mixtures thereof or another oxidant that is passed through the tube at a high temperature. This periodic burn-off can result in severe thermal cycling, which also reduces the life of the tubes.

During normal use, the internal surfaces of the refinery process tubes dealing with gas phase hydrocarbon process streams at high temperatures could be subjected to metal dusting, carburization, sulfidation, and other forms of high temperature corrosion as a result of the prolonged exposure to the stream of hydrocarbons including syngas, heavy crude oil, resid and other petroleum fractions.

Metal dusting is a deleterious form of high temperature corrosion experienced by Fe, Ni and Co-based alloys at temperatures in the range of 350-1050° C. in carbon-supersaturated (carbon activity >1) environments having relatively low (about 10-10 to about 10-20 atmospheres) oxygen partial pressures. This form of corrosion is characterized by the disintegration of bulk metal into powder or dust. Most alloys that are commercially available today degrade by this corrosion process. Very fine dust particles originated from corrosion process are known to catalyze coke formation on the metal surfaces. Carburization is a form of high temperature degradation, which occurs when carbon from the environment diffuses into the metal, usually forming carbides in the matrix and along grain boundaries at temperatures generally in excess of 1000° F. (538° C.). Carburized material suffers an increase in hardness and often a substantial reduction in toughness, becoming embrittled to the point of exhibiting internal creep damage due to the increased volume of the carbides. Sulfidation is another form of high temperature corrosion in the refinery process. Sulfur is generally present as an impurity in fuels or feedstocks, and reacts with oxygen to form $SO_2$ and $SO_3$. An atmosphere of this type is generally oxidizing. Oxidizing environments are usually much less corrosive than reducing environments; here sulfur is in the form of H2S. However, sulfidation in oxidizing environments as well as in reducing environments is frequently accelerated by other impurities, such as sodium, potassium, and chlorine, which may react among themselves and/or with sulfur during combustion to form salt vapors. These salt vapors may then deposit at lower temperatures on metal surfaces, resulting in accelerated sulfidation attack. As is the case with oxidation, alloying with chromium enhances resistance to sulfidation, almost in direct proportion to the chromium content when hydrogen is not present.

Conventional heat-transfer tubes suitable for refinery processes dealing with gas phase hydrocarbon process streams at high temperatures are typically formed from an alloy comprising chromium, iron, and nickel, as well as various other elements, usually in low concentration, e.g., ≤5.0 wt. %, to obtain desired performance. These tubes also can be made out of stainless steels such as ferritic stainless steels, austenitic stainless steels, martensitic stainless steels, precipitation-hardenable (PH) stainless steels, and duplex stainless steels for further enhanced corrosion resistance, creep strength and rupture ductility. The typical composition of stainless steels used in the conventional tubes is shown in Table 1.

TABLE 1

Typical Composition of Stainless Steels Used in the Conventional Tubes

| Stainless Steels | Name | UNS No. | Alloy Compositions (Weight %) |
|---|---|---|---|
| Ferritic stainless steels | 430 | S43000 | Bal.Fe:16.0~18.0Cr, 0.12C, 1.0Mn, 1.0Si, 0.04P, 0.03S |
| | 434 | S43400 | Bal.Fe:16.0~18.0Cr:0.75~1.25Mo, 0.12C, 1.0Mn, 1.0Si, 0.04P, 0.03S |
| Austenitic stainless steels | 302 | S30200 | Bal.Fe:17.0~19.0Cr:8.0~10.0Ni, 0.15C, 2.0Mn, 1.0Si, 0.045P, 0.03S |
| | 304 | S30400 | Bal.Fe:18.0~20.0Cr:8.0~10.5Ni, 0.08C, 2.0Mn, 1.0Si, 0.045P, 0.03S |
| | 304L | S30403 | Bal.Fe:18.0~20.0Cr:8.0~12.0Ni, 0.03C, 2.0Mn, 1.0Si, 0.045P, 0.03S |
| | 310 | S31000 | Bal.Fe:24.0~26.0Cr:19.0~22.0Ni, 0.25C, 2.0Mn, 1.5Si, 0.045P, 0.03S |
| | 316 | S31600 | Bal.Fe:16.0~18.0Cr:10.0~14.0Ni:2.0~3.0 Mo, 0.08C, 2.0Mn, 1.0Si, 0.045P, 0.03S |
| | 316L | S31603 | Bal.Fe:16.0~18.0Cr:10.0~14.0Ni:2.0~3.0 Mo, 0.03C, 2.0Mn, 1.0Si, 0.045P, 0.03S |
| | 321 | S32100 | Bal.Fe:17.0~19.0Cr:9.0~12.0Ni:0.4Ti, 0.08C, 2.0Mn, 1.0Si, 0.045P, 0.03S |
| | 347 | S34700 | Bal.Fe:17.0~19.0Cr:9.0~13.0Ni:0.8~1.1Nb, 0.08C, 2.0Mn, 1.0Si, 0.045P, 0.03S |
| Martensitic stainless steels | 440C | S44004 | Bal.Fe:16.0~18.0Cr:0.75Mo, 0.95~1.20C, 1.0Mn, 1.0Si, 0.04P, 0.03S |
| Precipitation-Hardenable (PH) stainless steels | A286C | S66286 | Bal.Fe:13.5~16.0Cr:24.0~27.0Ni:1.0~1.5Mo:0.35Al:1.9~2.35 Ti:0.10.5V:0.001~0.01B, 0.08C, 2.0Mn, 1.0Si, 0.04P, 0.03S |
| Duplex stainless steels | 2205C | S31803 | Bal.Fe:21.0~23.0Cr:4.5~6.5Ni:2.5~3.5Mo:0.08~0.2N, 0.03C, 2.0Mn, 1.0Si, 0.03P, 0.02S |

The five classes of stainless steels are categorized as ferritic stainless steels, austenitic stainless steels, martensitic stainless steels, precipitation-hardenable (PH) stainless steels, and duplex stainless steels. Four out of five classes based on the characteristic crystallographic structure/microstructure of the alloys in the family: ferritic, martensitic, austenitic, or duplex (a mixture of austenitic and ferritic). The fifth class, the PH stainless steels, is based on the type of heat treatment used, rather than the microstructure.

Ferritic stainless steels are so named because their body-centered-cubic (bcc) crystal structure is the same as that of iron at room temperature. These alloys are magnetic and cannot be hardened by heat treatment. In general, ferritic stainless steels do not have particularly high strength. Their poor toughness and susceptibility to sensitization limit their fabricability and their useable section size. Ferritic stainless steels contain between 11 and 30 wt. % Cr, with only small amounts of austenite-forming elements, such as carbon, nitrogen, and nickel. Their general use depends on their chromium content. Austenitic stainless steels constitute the largest stainless family in terms of alloys and usage. They possess excellent ductility, formability and toughness and can be substantially hardened by cold work. Although nickel is the primary element used to stabilize austenite, carbon and nitrogen are also used because they are readily soluble in the face-centered-cubic (fcc) structure. A typical 300-series stainless steels contain between 17 and 22 wt. % Cr. Corrosion resistance of 300-series stainless steels depends on alloy content. Molybdenum is added to S31600 to enhance corrosion resistance in chloride environments. High-chromium grades such as S31000 are used in oxidizing environments and high-temperature applications. To prevent inter-granular corrosion after elevated-temperature exposure, titanium or niobium is added to stabilize carbon in S32100 or S34700. Also, lower-carbon grades (AISI L or S designations) such as S30403 (type 304L), have been established to prevent intergranular corrosion. Martensitic stainless steels are similar to iron-carbon alloys that are austenitized, hardened by quenching, and then tempered for increased ductility and toughness. Wear resistance for martensitic stainless steels is very dependent on carbon content. For instance, S44004 (1.1 wt. % C) has excellent adhesive and abrasive wear resistance similar to tool steels, whereas S41000 (0.1 wt. % C) has relatively poor rear resistance. PH stainless steels are chromium-nickel grades that can be hardened by an aging treatment. For instance, S66286 is an austenitic PH stainless steel and various alloying elements such as Al, Ti and Nb are used to form intermetallic compounds after aging. Duplex stainless steels are chromium-nickel-molybdenum alloys that are balanced to contain a mixture of austenite and ferrite. Their duplex structure results in improved stress-corrosion cracking resistance, compared with the austenitic stainless steels, and improved toughness and ductility, compared with the ferritic stainless steels. The original alloy in this family was the predominantly ferritic, but the addition of nitrogen to duplex alloys such as S31803 increases the amount of austenite to nearly 50%. It also provides improved as-welded corrosion properties, chloride corrosion resistance, and toughness.

Conventional heat-transfer tubes that need to be resistant to corrosion and coking are manufactured from alloys having desirable properties at high temperature, such as high creep-strength and high rupture-strength. Since the tubes are exposed to a high temperature corrosion environment during hydrocarbon processes, the alloy is typically corrosion-resistant. And since the tubes are exposed to an oxidizing environment during decoking, the alloy is typically oxidation-resistant. Conventional heat-transfer tube alloys include austenitic Fe—Cr—Ni heat resistant steels based on a composition having 25 wt. % chromium and 35 wt. % nickel (referred to as a "25 Cr/35 Ni alloy"), or a composition having 35 wt. % chromium and 45 wt. % nickel (referred to as a "35 Cr/45 Ni alloy"). It is conventional to employ differing compositions of minor alloying elements in order to enhance high temperature strength and/or carburization resistance and other corrosion resistance. The typical composition of conventional heat-transfer tube alloys is shown in Table 2.

TABLE 2

Typical Composition of Conventional Heat-transfer Tube Alloys

| Name of Materials | Elements in weight % (Balance is Fe) |
|---|---|
| HP45Nb (25Cr/35Ni alloy) | 23~27Cr, 33~38Ni, 1.2~1.8Si, 1.2~1.7Mn, 0.2 max. Mo, 0.4~0.5C, 0.6~1.6Nb, 0.020 max. P, 0.020 max. S |
| HP16Nb (25Cr/35Ni alloy) | 22.5~26Cr, 35.5~37Ni, 1.2~1.8Si, 1.2~1.6Mn, 0.2 max. Mo, 0.14~0.18C, 0.7~1.4Nb, 0.020 max. P, 0.020 max. S |
| HN10NiNb | 18~23Cr, 31~34Ni, 0.8~1.3Si, 1.2~1.6Mn, 0.2 max. Mo, 0.09~0.12C, 0.8~1.2Nb, 0.020 max. P, 0.020 max. S |
| HP 40 Mod (25Cr/35Ni alloy) | 23.5~26.5Cr, 34~37Ni, 1.5~2.0Si, 1.25 max. Mo, 0.37~0.45C, other elements (W, Nb) |
| Pompey HP 40W | 24~27Cr, 33~37Ni, 1.5~2.0Si, 1.5 max. Mo, 0.37~0.50C, 3.8~5.0W |
| Pompey Manaurite XM | 23~28Cr, 33~38Ni, 1.0~2.0Si, 1.0~1.5Mo, 0.37~0.50C, other additions (Nb, Ti, Zr) |
| Manaurite XTM | 34~37Cr, 43~48Ni, 1.0~2.0Si, 1.0~2.0Mo, 0.4~0.45C, other additions (Nb, Ti) |
| Kubota KHR 45A (35Cr/45Ni alloy) | 30~35Cr, 40~46Ni, 2.0 max. Si, 2.0 max. Mn, 0.4~0.6C, other additions (Nb, Ti) |

In conventional heat-transfer tube alloys and stainless steels, a surface oxide comprising $Cr_2O_3$ typically forms during refinery processes dealing with gas phase hydrocarbon process streams at high temperatures. This oxide is believed to protect iron and nickel sites from contact with the gas phase hydrocarbon process streams, thereby lessening the amount of undesirable coke formation. It is observed, however, that under more severe refinery process conditions, e.g., conditions typically utilized for syngas generation dealing with gas phase hydrocarbon process streams at high temperatures, the formation of this protective oxide layer is suppressed in favor of carbon-containing phases, e.g., $Cr_3C_2$, $Cr_7C_3$, and/or $Cr_{23}C_6$. Accordingly, discontinuities develop over time in the corrosion-resistant scale located on the inner surface of refinery process tubes, resulting in iron and nickel exposure to the gas phase hydrocarbon process streams, leading to an increase in the rate of coke formation.

In an attempt to overcome this difficulty, U.S. Pat. Application Pub. No. 2012/0097289 discloses increasing the tube's carburization resistance by employing an alloy containing 5 to 10 wt. % aluminum. The alloy is said to form an $Al_2O_3$ scale during pyrolysis mode. It is reported that an $Al_2O_3$ scale remains in a stable oxide even under conditions where chromium preferentially forms carbides rather than oxides. Since such carburization-resistant alloys have a lower creep-strength and lower rupture-strength than do conventional heat-transfer tube alloys that do not contain aluminum, the reference discloses a tube structure wherein a continuous inner member formed from the aluminum-containing alloy is bonded to the inner surface of a tubular outer member which comprises a higher-strength alloy. While such tubes suppress coke formation, their dual-layer construction is economically demanding.

It is conventional to lessen the amount of aluminum in the steam cracker alloy in order to increase strength and thereby obviate the need for an outer member. See, e.g., U.S. Pat. No. 8,431,230, which discloses an aluminum-containing steam cracker alloy comprising 2 to 4 wt. % aluminum.

It is also conventional to increase the tube's heat transfer efficiency in order to expose the hydrocarbon and steam mixture to higher temperature and shorter contact time during pyrolysis, resulting in better selectivity for light olefin production. For example, increasing the heat transfer by increasing the tube's surface area that is exposed to the hydrocarbon feed is described in U.S. Pat. Nos. 6,419,885 and 6,719,953. Other methods for increasing the tube's heat transfer efficiency include the application of a mixing element (sometimes referred to as a "bead" or "fin") on the inner surface of the heat transfer tube. For example, U.S. Pat. No. 5,950,718 describes the use of a conventional 25Cr/35Ni tube that includes a helical mixing element that is applied to the tube inner surface by plasma powder welding or arc welding. It has been observed that the flow of hydrocarbon and steam mixture through a radiant tube during pyrolysis results in the formation of a boundary layer adjacent to the radiant tube's inner surface. The boundary layer comprises hydrocarbon. The mixing element disturbs the boundary layer, leading to increased mixing between the boundary layer and the core flow of hydrocarbon and steam mixture. It is conventional to lessen the pressure-drop of the hydrocarbon and steam mixture traversing radiant tubes which contain one or more mixing elements. For example, U.S. Pat. No. 7,799,963 describes a structure which provides a decreased pressure drop as a result of discontinuities in the mixing elements. Both the tube and the discontinuous mixing elements are formed from conventional steam cracker alloys such as 25 Cr/20 Ni, 25 Cr/35 Ni, 35Cr/45Ni, or Incolloy™.

Nevertheless, there remains a need for heat transfer tubes that suppress the formation of chromium-carbide phases while providing improved heat transfer through the incorporation of mixing elements. There still remains a need for refinery process tubes that suppress corrosion and coke formation during refinery processes dealing with gas phase hydrocarbon process streams at high temperatures while providing improved heat transfer through the incorporation of mixing elements.

SUMMARY

The disclosure is based in part on the development of a new heat-transfer tube weldment. The weldments described herein comprise a tubular member and at least one mixing element comprising aluminum, the mixing element being located on the inner surface of the tubular member. The tubular member comprises at least one heat-resistant, aluminum-containing alloy which forms an alumna-containing scale on the mixing element's surface during refinery processes dealing with gas phase hydrocarbon process streams at high temperatures. The mixing element also comprises at least one heat-resistant, aluminum-containing alloy, which forms an alumna-containing scale on the mixing element's surface during refinery processes dealing with gas phase hydrocarbon process streams at high temperatures. The mixing element's heat-resistant, aluminum-containing alloy can be the same as or different from the tubular member's heat-resistant, aluminum-containing alloy. The tubular member is formed, e.g., by one or more of casting, forging, rolling, joining, machining, etc.

Accordingly, certain aspects of the disclosure relate to a weldment suitable for use a tube in a refinery processes dealing with gas phase hydrocarbon process streams at high temperatures, e.g., as a heat-transfer tube. The weldment comprises a first tubular member having inner and outer surfaces, and has at least one mixing element in surface contact with the tubular member's inner surface. The first tubular member includes at least one first refinery process tube alloy which comprises aluminum. The mixing element comprises a second refinery process tube alloy, which also comprises aluminum.

The first refinery process tube alloy can comprise, e.g., an amount of aluminum A1 in the range of from 2.0 wt. % to 10.0 wt. %, based on the weight of the first refinery process tube alloy. The second refinery process tube alloy can comprise, e.g., an amount of aluminum A2 in the range of from 2.0 wt. % to 10.0 wt. %, based on the weight of the second refinery process tube alloy, with the first and second refinery process tube alloys having the same or different aluminum content, e.g., the concentration of aluminum in the second refinery process tube alloy and the first refinery process tube alloy can differ by at least 0.5 wt. %. In aspects where the first and second refinery process tube alloys have different aluminum concentrations, the second refinery process tube alloy typically has a greater aluminum content than that of the first refinery process tube alloy, such as where the first refinery process tube alloy comprises from 2.0 to 4.0 wt. % aluminum and the second refinery process tube alloy comprises from 5.0 to 10.0 wt. % aluminum.

In other aspects, the disclosure relates to a refinery processes dealing with gas phase hydrocarbon steams, comprising passing hydrocarbon conversion process streams including syngas under syngas generation conditions through at least one heat transfer tube including gas-gas heat exchangers, wherein the heat transfer tube comprises a weldment according to any of the preceding aspects.

It is observed that when using the weldment of any of the preceding aspects as a refinery process tube during hydrocarbon conversion mode, a protective corrosion-resistant layer forms over at least a portion of the outer tubular member surface and over at least a portion of the at least one mixing element (e.g., that portion of the mixing element's surface that is exposed to refinery process stream). The corrosion-resistant layer comprises alumina and can be substantially free of chromium. The heat-transfer tube weldment of the disclosure has surprisingly improved corrosion resistance compared to conventional heat-transfer tubes, while providing improved mixing associated with the presence of one or more mixing elements.

The specified heat-transfer tube weldment, thereby, provides stable, durable surfaces to resist high temperature corrosion, e.g. metal-dusting and carburization, and coking in refinery process tubes, gas-gas heat exchangers, and other components in hydrocarbon conversion plants for transporting or conveying hydrocarbon-containing process streams, which may be prone to coking.

DETAILED DESCRIPTION

Definitions

For the purpose of this description and appended claims, the following terms are defined.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein in the specification and the claim can be modified by the term "about."

"Periodic Table" means the PERIODIC CHART OF THE ELEMENTS, The Merck Index, 12th Ed., Merck & Co., Inc., 1996. "Refinery process tube alloy" means any composition, solid solution, or solid mixture suitable for use as tubing in refinery processes dealing with gas phase hydrocarbon process streams at high temperatures, including hydrocarbon conversion processes such as syngas generation. Such alloys show conductivity indicating metallic behavior and include at least 10 wt. % chromium.

"Weldment" means a unit formed by connecting together two or more components, where the connection includes at least one weld. The term "weldment" encompasses units formed by plasma powder welding a mixing element to a tubular member, such as a refinery process tube suitable for use in a hydrocarbon conversion processes. Although all components of a weldment can be joined to the weldment by welding, this is not required.

"Heat transfer tube" includes but is not limited to any of the following members of a refinery process tubes: feed stream conduits; product stream conduits; effluent stream conduits; hydrocarbon conversion furnace tubes, such as convection tubes and/or radiant tubes, including those arranges in one or more coils; cross-over piping; transfer line exchangers; gas-gas heat exchangers; quench zone conduits; and other components in the refinery processes that may be exposed to a gas phase hydrocarbon process streams at a temperature exceeding 350° C. The term "heat-transfer tube" also includes tubes providing heat-transfer functionality (among other functionalities, if any) in other processes for hydrocarbon conversion, including those in which metal dusting or carburization may occur, such as conduits for transporting or conveying hydrocarbon conversion process streams which may be prone to coking.

"Mixing element" means a protrusion from the inner surface of the tubular member provided the protrusion includes a contact angle formed between the inner surface of the tubular member and an edge of the protrusion, e.g., an incomplete coating on the inner surface, such as a bead weld formed from a refinery process tube alloy. Since a mixing element is not a complete coating on the tubular member's internal surface, a boundary exists between (i) a region of the tubular member's interior surface which is not covered by a mixing element and (ii) a region of the tubular member's interior surface which is covered by a mixing element. The boundary typically includes a contact angle, with the contact angle's vertex typically located proximate to the mixing element's perimeter on the tubular member's inner surface. The extent of a contact angle (e.g., the angular range subtended) is determined macroscopically. Imperfect contact angles, as might be observed when an interfacial region proximate to a contact angle's vertex is viewed microscopically, are within the scope of the disclosure. A mixing element may be discrete (e.g., an island on the tubular member's interior surface) or continuous (e.g., a continuous weld bead along the tubular member's interior surface having a contact angle that is substantially constant along the length of the bead and substantially equal on either side of the bead. Particular mixing designs and configurations are described in U.S. Pat. Nos. 5,950,718, 6,419,885, 6,719,953, and 7,799,963, particularly those having a configuration as described in U.S. Pat. No. 7,799,963, the disclosure of each is incorporated herein in its entirety.

Unless otherwise indicated, all amounts, concentrations, and weight percentages recited herein are based on the total weight of the referenced composition, e.g., first refinery process tube alloy, second refinery process tube alloy, etc., as the case may be.

Weldments

Weldments useful as heat-transfer tubes for conveying gas phase hydrocarbon process streams at high temperatures will now be described. In particular weldments useful as heat-transfer tubes for conveying syngas streams for hydrocarbon conversion processes at high temperatures will now be described. The disclosure is not limited to weldments conveying syngas streams, and this description is not meant to foreclose the use of such weldments for conveying other hydrocarbon process streams in multiple refinery processes dealing with gas phase hydrocarbon process streams at high temperatures within the broader scope of the disclosure.

The weldment includes (i) a tubular member which comprises a first refinery process tube alloy and having inner and outer surfaces and (ii) at least one mixing element in surface contact with the inner surface of the tubular member. The first and second refinery process tube alloys are each selected from among those alloys that are capable of forming an alumina-containing protective coating (e.g., a scale) on the mixing element's surface during exposure of the mixing element's surface to syngas streams during hydrocarbon conversion processes.

The weldment may be formed by securing the mixing element to the tubular member's inner surface by any suitable welding means, e.g., plasma power welding or argon/helium arc welding. Neither plasma powder welding nor argon/helium arc welding are coating technologies, e.g., thermal spraying, but instead are examples of welding overlay technology. In powder plasma welding, for example, metal powder is melted and welded by plasma torch on the inside surface of the base tube. A mixing element in the form of a continuous or discontinuous metal overlay on a portion of the tubular member's inner surface having a thickness of 1.0 to 3.0 mm, 1.5 to 2.5 mm, or 1.75 to 2.25 mm is strongly bonded by welding to provide a substantially pore-free overlay. The resulting weldment may be optionally post-annealed, tempered, laser melted or a combination thereof to increase the mixing elements mass density (and decrease its porosity).

In contrast, the conventional thermal spray coating processes such as plasma, HVOF and detonation gun generally yield a substantially continuous coating of a metal layer over the entire inner surface of the tubular member. Such a coating might have greater porosity than that resulting from the mixing elements of the disclosure, such as those produced by plasma powder welding a discontinuous bead of the specified second refinery process tube alloy on the tubular member's inner surface. The conventional thermal spray coating is produced by a process in which molten or softened particles are applied by impact onto a substrate. While not wishing to be bound by any theory or model, it is believed that such conventional coatings contain reticular or lamellar grain structure resulting from the rapid solidification of small globules, flattened from striking a cold surface at high velocities. It is difficult to ensure that all particles are the exact same size and achieve the same temperature and velocity. Thus, variations in the conditions of the individual particles on impact during thermal spray process lead to heterogeneous structure, which includes excessive porosity.

Mixing elements of the disclosure may be configured in any convenient manner according to the design of the tube. For example, the mixing element should be configured to agitate the flow of hydrocarbon process streams passing through the weldment to distribute the flow of hydrocarbon process streams across a transverse cross section of tube to create a generally uniform temperature profile across an entire transverse cross section of the passage. This is typically accomplished by utilizing a tubular member having an internal circular cross-sectional area that is substantially open to fluid flow through the tube, with the mixing element protruding from at least one region on the inner surface of the tubular member. When the weldment comprises a plurality of mixing elements, all of the mixing elements optionally have the substantially the same composition and optionally all are of the same size and shape. For example, the plurality of mixing elements can be in the form of fins projecting in a direction substantially intersecting a longitudinal axis of the tubular member and operable to deflect a flow of hydrocarbon material in the tube. When the weldment is used as a refinery process tube, this arrangement increases the uniformity of the temperature profile of the flow of hydrocarbon process streams in relation to a transverse cross section of tube. The mixing element may comprise a plurality discretely formed protrusions or a continuous protrusion along the inner surface of the tubular member. The protrusions, whether discontinuous or continuous, may be arranged in one or more generally helical designs along the inner surface. Methods for securing mixing elements to tubular member surfaces as well as the configuration of mixing elements are described in U.S. Pat. Nos. 5,950,718 and 7,799,963, any of which may be used in the weldments described herein.

First Tubular Member

The weldment typically comprises a first tubular member, the first tubular member having (i) inner and outer surfaces and (ii) at least one internal channel defined by the tubular member's inner surface, the channel being open for fluid flow into, through, and out of the tubular member. The first refinery process tube alloy may have any composition provided (i) it has performance characteristics (such as heat-transfer, ductility, and strength characteristics) that render it suitable for use in multiple refinery processes dealing with gas phase hydrocarbon steams including hydrocarbon conversion processes, and (ii) is capable of forming an alumina-containing protective coating (e.g., a scale) on the tubular member's internal surface during multiple refinery processes dealing with gas phase hydrocarbon steams including hydrocarbon conversion processes. Some such alloys are described in Table 1, concentrations reported in mass %, based on total mass of the alloy, Tr indicates the element may be present at a concentration generally <0.2 wt. %. Certain examples of the first refinery process tube alloy comprise aluminum, nickel and chromium; and optionally in addition to these one or more of iron, silicon, carbon, manganese, tungsten, molybdenum, titanium, zirconium, niobium, boron, and one or more rare earths.

The first refinery process tube alloy purposely includes aluminum, typically at a level ≥ about 2.0 wt. %, e.g., ≥ about 2.5 wt. %, such as ≥ about 3.0 wt. %, or ≥ about 3.5 wt. %, or ≥ about 4.0 wt. %, or ≥ about 4.5 wt. %, or ≥ about 5.5 wt. %, or ≥ about 6.0 wt. %, or ≥ about 6.5 wt. %, or ≥ about 7.0 wt. %, or ≥ about 8.0 wt. %, or ≥ about 9.0 wt. %, or ≥ about 9.5 wt. %, or ≥ about 10.0 wt. % aluminum. Additionally or alternatively, the concentration of aluminum in the first refinery process tube alloy may be ≤ about 10.0 wt. %, e.g., ≤ about 9.5 wt. %, or ≤ about 9.0 wt. %, or ≤ about 8.0 wt. %, or ≤ about 7.0 wt. %, or ≤ about 6.5 wt. %, or ≤ about 6.0 wt. %, or ≤ about 5.5 wt. %, or ≤ about 4.5 wt. %, or ≤ about 4.0 wt. %, or ≤ about 3.5 wt. %, ≤ about 3.0 wt. %, or ≤ about 2.5 wt. %, or about 2.0 wt. %. Ranges of the aluminum content in the first refinery process tube alloy that are expressly disclosed include combinations of any of the above-enumerated values, e.g., about 2.0 to about 10.0 wt. % aluminum, or about 2.0 to about 8.0 wt. %, or about 2.0 to about 7.0 wt. %, or about 2.0 to about 6.0 wt. %, or about 2.0 to about 4.0 wt. %, or about 2.5 to about 4.0 wt. %, or about 3.0 to about 4.0 wt. %, or about 3.5 to about 4.0 wt. % aluminum etc. At least about 2.0 wt. % aluminum is preferred where formation of sufficient quantity of the corrosion-resistant layer on the inner tube surface is desired. High concentrations of aluminum e.g., in the first refinery process tube alloy, e.g., ≥ about 4 wt. %, may lead to a degradation in certain properties of the first tubular member, such as a decrease in ductility, which can lead to a decrease in performance of the weldment during multiple refinery processes dealing with gas phase hydrocarbon steams including hydrocarbon conversion processes. It has been found that this difficulty can be overcome with the weldments of the disclosure by including in the weldment a second tubular member that is generally coaxial with the first tubular member, with the outer surface of the first tubular member typically being proximate to the inner surface of the second tubular member. The second tubular member typically comprises at least one alloy having improved mechanical properties, e.g., improved ductility, creep, and/or rupture strength, compared to the first steam cracker alloy.

In addition to aluminum, the first refinery process tube alloy typically comprises chromium and/or nickel. For example, the first steam cracker alloy can comprise ≥ about 15.0 wt. % chromium, e.g., ≥ about 17.5 wt. %, or ≥ about 18.0 wt. %, or ≥ about 20.0 wt. %, or ≥ about 22.0 wt. %, or ≥ about 24.0 wt. %, or ≥ about 30.0 wt. %, or ≥ about 35.0 wt. %, or ≥ about 40.0 wt. % chromium. Additionally or alternatively, the refinery process tube alloy may comprise chromium in an amount of ≤ about 50.0 wt. %, e.g., ≤ about 45.0 wt. %, or ≤ about 40.0 wt. %, or ≤ about 35.0 wt. %, or ≤ about 30.0 wt. %, or ≤ about 25.0 wt. %, or ≤ about 22.0 wt. %, or ≤ about 18.0 wt. %, or ≤ about 16.0 wt. %. Ranges of the chromium content in the first refinery process tube alloy that are expressly disclosed include combinations of any of the above-enumerated values, e.g., about 15.0 to about 50.0 wt. %, or about 16 to about 30.0 wt. %, or about 20.0 to about 30.0 wt. %, or about 22.0 to about 30.0 wt. %, or about 24.0 to about 35.0 wt. %, etc. When the concentration of chromium is at least 15.0 wt. % the integrity of the weldment is substantially maintained in the presence of the corrosion layer. Those skilled in the art will appreciate that the amount of chromium should not be so large as to result in a decrease in the alloy's high temperature mechanical properties, such as a decrease in high-temperature creep resistance and/or high-temperature rupture strength.

The amount of nickel in the first refinery process tube alloy may be ≥ about 18.0 wt. % nickel, e.g., ≥ about 20.0, such as ≥ about 25.0 wt. %, or ≥ about 30.0 wt. %, or ≥ about 35.0 wt. %, or ≥ about 40.0 wt. %, or ≥ about 45.0 wt. %, or ≥ about 50.0 wt. %, or ≥ about 55.0 wt. %, or ≥ about 65.0 wt. % nickel. Additionally or alternatively, the amount of nickel in the refinery process tube alloy may be ≤ about 70.0 wt. %, e.g., ≤ about 65.0 wt. %, or ≤ about 55.0 wt. %, or ≤ about 50.0 wt. %, or ≤ about 45.0 wt. %, or ≤ about 40.0 wt. %, or ≤ about 35.0 wt. %, or ≤ about 30.0 wt. %, or ≤ about 20.0 wt. % or ≤ about 25.0 wt % nickel. Ranges of the nickel content in the first refinery process tube alloy that are expressly disclosed include combinations of any of the above-enumerated values, e.g., about 18.0 to about 70.0 wt. %, or about 25.0 to about 45.0 wt. %, or about 30.0 to about 55.0 wt. %, or about 35.0 to about 55.0 wt. %, or about 40.0 to about 55.0 wt. %, or about 45.0 to about 55.0 wt. %, or about 50.0 to about 55.0 wt. %, etc. Nickel is believed to provide the refinery process tube alloy with oxidation resistance. Although a lower concentrations of nickel can be compensated by an increased iron content, those skilled in the art will appreciate that sufficient nickel should be included in the alloy to prevent the formation of oxides, e.g., chromium oxides, iron oxides, and/or manganese oxides, that inhibit the formation of the desired corrosion-resistant layer.

The amount of iron in the first refinery process tube alloy may be ≤ about 65.0 wt. %, e.g., ≤ about 65.0 wt. %, or ≤ about 55.0 wt. %, or ≤ about 45.0 wt. %, or ≤ about 35.0 wt. %, or ≤ about 25.0 wt. %, or ≤ about 15.0 wt. %, or ≤ about 5.0 wt. %. Additionally or alternatively, the first refinery process tube alloy may comprise iron in an amount of ≥0 wt. %, e.g., ≥ about 0.10 wt. %, such as ≥ about 5.0 wt. %, or ≥ about 15.0 wt. %, or ≥ about 25.0 wt. %, or ≥ about 35.0 wt. %, or ≥ about 45.0 wt. %, or ≥ about 55.0 wt. % iron. Ranges of the iron content in the first refinery process tube alloy that are expressly disclosed include combinations of any of the above-enumerated values, e.g., about 0 to about 65.0 wt. % iron, or about 1.0 to about 65.0 wt. %, or about 5.0 to about 65.0 wt. %, or about 15.0 to about 65.0 wt. %, or about 35.0 to about 55.0 wt. %, or about 40.0 to about 55.0 wt. %, or about 45.0 to about 55.0 wt. %, or about 50.0 to about 55.0 wt. % iron, etc.

Carbon may be present in the first refinery process tube alloy in an amount ≥0.05 wt. %, e.g., ≥ about 0.1 wt. %, such as ≥ about 0.2 wt. %, or ≥ about 0.3 wt. %, or ≥ about 0.4 wt. %, or ≥ about 0.5 wt. %, or ≥ about 0.6 wt. % carbon. Additionally or alternatively, carbon may be present in an amount ≤ about 0.7% wt. %, e.g., ≤ about 0.6% wt. %, or ≤ about 0.5% wt. %, or ≤ about 0.4% wt. %, or ≤ about 0.3% wt. %, or ≤ about 0.2% wt. %, or ≤ about 0.1% wt. % carbon. Ranges of the carbon content in the first refinery process tube alloy that are expressly disclosed include combinations of any of the above-enumerated values, e.g., about 0.05 to about 0.7 wt. % carbon, or about 0.05 to about 0.6 wt. %, or about 0.05 to about 0.5 wt. %, or about 0.05 to about 0.4 wt. %, or about 0.05 to about 0.3 wt. %, or about 0.05 to about 0.2 wt. %, or about 0.05 to about 0.1 wt. %, or about 0.3.0 to about 0.5 wt. % carbon, etc. Carbon is believed to enhance the first tubular member's castability and high-temperature mechanical properties, such as creep resistance and rupture strength. Those skilled in the art will appreciate that the amount of carbon should not be so large as to result in (i) the formation of coke or other distinct carbonaceous phases and/or (ii) a decrease in the alloy's ductility and/or toughness.

When silicon is present in the first refinery process tube alloy it may be present at a concentration of ≤ about 2.5 wt. % silicon, e.g., ≤ about 2.0 wt. %, or ≤ about 1.5 wt. %, or ≤ about 1.0 wt %, or ≤ about 0.5 wt. %, or ≤ about 0.1 wt. % silicon. Additionally or alternatively, the silicon concentration in the first refinery process tube alloy may be ≥0 wt. %, e.g., ≥ about 0.1 wt. %, such as ≥ about 0.2 wt. %, or ≥ about 0.3 wt. %, or ≥ about 0.4 wt. % silicon. Ranges of the silicon content in the first refinery process tube alloy that are expressly disclosed include combinations of any of the above-enumerated values, e.g., 0 to about 2.5 wt. % silicon, 0 to about 2.0 wt. %, 0 to about 1.5 wt. %, 0 to about 1.0 wt. %, 0 to about 0.5 wt. %, 0 to about 0.1 wt. % silicon, etc. Silicon is believed to serve as a deoxidizer and give higher flowability to the alloy in the molten state. Those skilled in the art will appreciate that the amount of silicon should not be so large as to result in a decrease in the alloy's high temperature mechanical properties, such as a decrease in high-temperature creep resistance and/or high-temperature rupture strength.

Manganese may be present in the first refinery process tube alloy, e.g., to serve as an oxygen and/or sulfur scavenger when the alloy is in the molten state. When such scavenging functionality is desired, manganese is generally present at a concentration of ≤ about 3.0 wt. %, e.g., ≤ about 2.5 wt. %, or ≤ about 2.0 wt. %, or ≤ about 1.5 wt. %, or ≤ about 1.0 wt. %, or ≤ about 0.5 wt. %, or ≤ about 0.1 wt. %, or about 0 wt. % manganese. Ranges of the manganese content in the first steam cracker alloy that are expressly disclosed include combinations of any of the above-enumerated values, e.g., 0 to about 3.0 wt. % manganese, 0 to about 2.5 wt. %, 0 to about 2.0 wt. %, 1.0 to about 2.0 wt. %, 1.5 to 2.5 wt. % manganese, etc.

Tungsten and/or molybdenum may also be present in the first refinery process tube alloy in an amount of 0.1 to about 10.0 wt. %, e.g., 0.5 to 10.0 wt. %, 1.0 to 5 wt. %, particularly 0.5 to 10 wt. % tungsten, 1 to 8 wt. % tungsten, and/or 0.1 to 5.0 wt. % molybdenum, 0.5 to 3 wt. % molybdenum. It is believed that molybdenum and tungsten enhance the alloy's high-temperature mechanical properties, such as creep resistance and rupture strength. When both elements are present the combined concentration generally should not exceed 10% wt. %.

Optionally, the first refinery process tube alloy includes one or more of titanium, zirconium, and niobium. When used, the total concentration of these elements is generally ≥ about 0.1 wt. %, e.g., about 0.1 to about 1.8 wt. %, or about 0.1 to about 1.5 wt. %, or about 0.1 to about 1.0 wt. %, or about 0.1 to about 0.6 wt. %. Particularly, titanium and or zirconium may be present in an amount of about 0.1 to about 0.6 wt. %. Niobium may be present in an amount of about 0.1-1.8%.

Boron may be present in the first refinery process tube alloy improve grain boundary performance. Generally boron may be present in an amount of 0 to about 0.1% wt. %, e.g., 0 to 0.07 wt. %, 0 to about 0.5 wt. %, or 0.05 to about 0.1 wt. %.

The first refinery process tube alloy may also include one or more rare-earth elements, i.e., 15 elements of the lanthanide series ranging from lanthanum to lutetium in the Periodic Table, and yttrium and scandium, particularly cerium, lanthanum and neodymium, in an amount of about 0.005 to about 0.4 wt. %. As for the rare-earth elements to be incorporated into the present alloy, cerium, lanthanum and neodymium may form, in a combined amount, at least about 80%, more preferably at least about 90%, of the total amount of the rare-earth elements. The presence of rare earth elements is believed to contribute to the formation and stabilization of the carburization-resistant layer.

First refinery process tube alloys containing phosphorous, sulfur, and other impurities, such as those inevitably incorporated into the alloy when the material is prepared, are within the scope of the disclosure. Those skilled in the art will appreciate that the amount of these impurities should not be so large as to exceed the amounts that are typical in conventional refinery process tube alloys.

In certain aspects, the first tubular member comprises more than one of the foregoing first refinery process tube alloys. Combinations and permutations of any of the specified first refinery process tube alloy compositions are expressly within the scope of the disclosure. Examples of suitable first refinery process tube alloys are disclosed in U.S. Pat. Nos. 6,409,847, 7,963,318, and 8,431,230, each of which is incorporated by reference herein in its entirety. In particular aspects, the first refinery process tube alloy comprises ≤65.0 wt. % iron, ≥18.0 wt. % chromium, and ≥25.0 wt. % nickel, e.g., ≥ about 20.0 wt. % chromium, and iron. Iron is typically, although not necessarily, present at a concentration of ≥ about 25.0 wt. %. Exemplary first refinery process tube alloy compositions are provided in Table 3, concentrations reported in mass %, based on total mass of the alloy, RE represents the total amount of rare earth elements. First refinery process tube alloys can be selected e.g., from those Kubota alloys available under the trade name Aftalloy™, and from those Schmidt and Clemens GmbH & Co, alloys available under the trade name Centralloy™ HTE.

A non-limiting list of the first refinery process tube alloys for use in the present disclosure is also presented in Table 4. Some of the first refinery process tube alloys listed in the table is entirely based on nickel, free of iron. Alternatively some of the first refinery process tube alloys listed in the table is entirely based on iron, free or nickel. These alloy compositions are also suitable for making the first refinery process tube alloys. In the table 4, AFA stands for alumina forming austenitic (AFA) stainless steels developed by Oak Ridge National Laboratory (ORNL). The AFA stainless steels are unique in that the composition allows for forming an alumina-containing protective coating (e.g., a scale) on the tubular member's internal surface during multiple refinery processes dealing with gas phase hydrocarbon steams including hydrocarbon conversion processes. This provides corrosion resistance, and displays excellent creep strength at high temperatures (700~800° C.). AFA stainless steels further consist of, in terms of weight percent ranges 0.15-0.5 C; 8-37Ni; 10-25Cr; 2.5-5Al; greater than 0.6, up to 2.5 total of at least one element selected from the group consisting of Nb and Ta; up to 3 Mo; up to 3 Co; up to 1 W; up to 3 Cu; up to 15 Mn; up to 2 Si; up to 0.15 B; up to 0.05 P; up to 1 total of at least one element selected from the group consisting of Y, La, Ce, Hf, and Zr; <0.3Ti+V; <0.03N; and, balance Fe, where the weight percent Fe is greater than the weight percent Ni, and wherein the alloy forms an external continuous scale comprising alumina, and a stable essentially single phase FCC austenitic matrix microstructure, the austenitic matrix being essentially delta-ferrite free and essentially BCC-phase-free. Examples of AFA stainless steels are disclosed in U.S. Pat. No. 8,431,072.

TABLE 3

Exemplary Al-Containing First Refinery Process Tube Alloys

| Ex | C | Si | Mn | Cr | Ni | Al | RE | W | Mo | Ti | Zr | B | Fe |
|---|---|---|---|---|---|---|---|---|---|---|---|---|---|
| 1 | 0.42 | 1.5 | 1.1 | 24.9 | 34.9 | 2.9 | 0.21 | 3.2 | | | 0.23 | | 30.6 |
| 2 | 0.45 | 1.4 | 1.0 | 24.6 | 34.5 | 3.3 | 0.26 | | 3.1 | | | | 31.39 |
| 3 | 0.44 | 1.4 | 1.2 | 25.5 | 35.0 | 2.7 | 0.24 | 3.0 | | | | | 30.52 |
| 4 | 0.42 | 1.2 | 1.1 | 25.1 | 34.7 | 2.9 | 0.28 | 2.8 | | 0.16 | | | 31.34 |
| 5 | 0.45 | 1.3 | 1.2 | 25.4 | 34.8 | 2.7 | 0.23 | 2.7 | | | | 0.05 | 31.17 |
| 6 | 0.06 | 1.4 | 0.9 | 25.1 | 35.0 | 3.8 | 0.33 | 3.2 | | | | | 30.21 |
| 7 | 0.31 | 1.5 | 1.3 | 24.7 | 35.4 | 3.4 | 0.35 | 3.3 | | | | | 29.74 |
| 8 | 0.67 | 1.3 | 1.2 | 24.9 | 34.6 | 3.4 | 0.27 | 3.3 | | | | | 30.36 |
| 9 | 0.42 | 1.3 | 1.2 | 24.7 | 34.9 | 2.1 | 0.29 | 3.4 | | | | | 31.69 |
| 10 | 0.37 | 1.6 | 1.2 | 24.8 | 34.8 | 3.5 | 0.07 | 2.7 | | | | | 30.96 |
| 11 | 0.39 | 1.4 | 1.1 | 24.9 | 34.6 | 3.5 | 0.39 | 3.0 | | | | | 30.72 |
| 12 | 0.38 | 1.5 | 1.1 | 24.8 | 20.0 | 3.1 | 0.34 | 3.2 | | | | | 45.58 |
| 13 | 0.44 | 1.2 | 1.2 | 17.5 | 69.0 | 3.4 | 0.33 | 3.5 | | | | | 3.4 |
| 14 | 0.44 | 1.3 | 1.0 | 25.1 | 33.7 | 3.3 | 0.28 | 1.4 | | | | | 33.4 |
| 15 | 0.41 | 1.4 | 1.1 | 25.2 | 34.8 | 3.5 | 0.27 | 5.6 | | | 0.11 | | 27.6 |
| 16 | 0.39 | 1.3 | 1.2 | 25.3 | 35.5 | 3.2 | 0.24 | 2.3 | 1.2 | | | | 29.3 |
| 17 | 0.40 | 1.5 | 1.2 | 25.2 | 35.0 | 3.1 | 0.22 | 3.0 | | 0.10 | | | 30.2 |
| 18 | 0.40 | 0.4 | 0.1 | 22.9 | 34.7 | 3.6 | 0.01 | 2.9 | | | | | 34.9 |
| 19 | 0.42 | 0.3 | 0.2 | 23.5 | 34.8 | 3.5 | 0.03 | 3.0 | | | | | 34.2 |
| 20 | 0.15 | 0.4 | 0.2 | 23.6 | 34.5 | 3.4 | 0.27 | 6.4 | | | | | 31.0 |
| 21 | 0.12 | 0.4 | 0.2 | 24.0 | 34.2 | 3.4 | 0.27 | 9.7 | | | | | 27.7 |
| 22 | 0.43 | 0.3 | 0.1 | 24.2 | 34.1 | 3.2 | 0.24 | 2.8 | | 0.15 | | | 34.4 |
| 23 | 0.40 | 0.5 | 0.2 | 23.7 | 34.5 | 3.4 | 0.06 | 2.9 | | | | | 34.3 |
| 24 | 0.43 | 0.4 | 0.2 | 23.6 | 33.8 | 3.4 | 0.28 | 2.1 | | | | | 35.7 |
| 25 | 0.36 | 0.3 | 0.2 | 24.0 | 34.0 | 3.1 | 0.22 | 2.7 | | | 0.18 | | 34.9 |
| 26 | 0.41 | 1.5 | 1.1 | 23.9 | 33.4 | 2.9 | 0.19 | | 2.9 | 0.12 | | | 33.5 |
| 27 | 0.38 | 1.3 | 0.9 | 23.7 | 33.7 | 3.8 | 0.16 | 2.5 | | | | | 33.5 |
| 28 | 0.33 | 0.3 | 0.2 | 24.4 | 45.3 | 3.6 | 0.18 | 2.8 | | 0.08 | | | 22.8 |
| 29 | 0.26 | 0.4 | 0.2 | 23.8 | 44.4 | 3.5 | 0.13 | | 2.1 | | | | 25.2 |
| 30 | 0.43 | 1.4 | 1.0 | 25.0 | 35.1 | 3.2 | | | | | | | 33.8 |

TABLE 4

Exemplary Al-Containing First Refinery Process Tube Alloys

| Example | Alloy Compositions (Weight %) |
|---|---|
| NiCrAl | Bal.Ni:25.0Cr:6.0Al |
| NiCrAlY | Bal.Ni:30.0Cr:10.0Al:1.0Y |
| NiFeCrAl | Bal.Ni:21.4Cr:5.6Al:12.9Fe:0.1Mn:0.6Si:0.1Ti:0.02C |
| NiFeCrAl-2 | Bal.Ni:25.0Cr:6.0Al:10.0Fe |
| NiFeCrAl-3 | Bal.Ni:25.0Cr:5.0Al:35.0Fe |
| NiFeCrAl-4 | Bal.Ni:19.9Cr:5.2Al:38.6Fe:0.3Si |
| NiFeCrAl-5 | Bal.Ni:21.6Cr:5.5Al:34.9Fe:0.3Si |
| NiFeCrAlY | Bal.Ni:25.0Cr:6.0Al:10.0Fe:0.5Y |
| NiFeCrAlY-2 | Bal.Ni:25.0Cr:5.0Al:35.0Fe:0.5Y |
| NiFeCrAl—$Y_2O_3$ | Bal.Ni:25.0Cr:6.0Al:10.0Fe:0.5$Y_2O_3$ |
| NiFeCrAl—$Y_2O_3$-2 | Bal.Ni:25.0Cr:6.0Al:35.0Fe:0.5$Y_2O_3$ |
| FeCrAl | Bal.Fe:20Cr:5.0Al |
| FeCrAlY | Bal.Fe:22Cr:5.5Al:0.5Y |
| PM2000 | Bal.Fe:19.0Cr:5.5Al:0.5Ti:0.5$Y_2O_3$ |
| MA956 | Bal.Fe:20Cr:5Al:0.5$Y_2O_3$ |
| Kanthal APM | Bal.Fe:22.0Cr:5.8Al:0.2Mn:0.4Si:0.05C |
| Kanthal APMT | Bal.Fe:21.0Cr:5.0Al:3.0Mo:0.7Si:0.08C |
| AFA-17 | Bal.Fe:15.0Cr:3.0Al:25.0Ni:2.5Nb:2.0Mo:2.0Mn:0.15Si:0.1C:0.01B:0.15Hf:0.07Y |
| AFA-20 | Bal.Fe:15.0Cr:4.0Al:25.0Ni:2.5Nb:2.0Mo:2.0Mn:0.15Si:0.1C:0.01B:0.15Hf:0.07Y |
| AFA-OC1 | Bal.Fe:14.2Cr:3.0Al:20.0Ni:2.5Nb:2.0Mo:2.0Mn:0.14Si:0.1C:0.02P:0.51Cu:0.97W:0.04V:0.05Ti |
| AFA-OC2 | Bal.Fe:14.3Cr:3.0Al:25.0Ni:1.0Nb:2.0Mo:2.0Mn:0.14Si:0.05C:0.51Cu:0.96W:0.04V:0.05Ti |
| AFA-OC4 | Bal.Fe:14.0Cr:3.55Al:25.0Ni:2.53Nb:2.0Mo:2.0Mn:0.14Si:0.1C:0.51Cu:0.95W:0.04V:0.05Ti |

The first refinery process tube alloy may be formed into the tubular member by any suitable means, e.g., by one or more of casting, forging, rolling, joining, machining, etc. Conventional forming methods can be used, such as centrifugal casting, but the disclosure in not limited thereto. Exemplary centrifugal casting apparatus and methods are described in U.S. Pat. No. 5,223,278, incorporated herein by reference in its entirety. The disclosure, however, is not limited thereby.

Mixing Element(s)

In addition to the first tubular member, the weldments herein include at least one mixing element in surface contact with the inner surface of the tubular member. Mixing elements serve to agitate the flow of hydrocarbon process streams (i.e., gas phase hydrocarbon feedstocks, products and effluent streams, etc.) conveyed through the weldment's interior passage(s). When a plurality of the mixing elements is present in the weldment, each of the mixing elements can be of the same composition, but this is not required. At least one mixing element comprises a second refinery process tube alloy having a concentration of aluminum typically ≥ about 2.0 wt. %, e.g., ≥ about 2.5 wt. %, or ≥ about 3.0 wt. %, or ≥ about 3.5 wt. %, or ≥ about 4.0 wt. %, or ≥ about 4.5 wt. %, or ≥ about 5.5 wt. %, or ≥ about 6.0 wt. %, or ≥ about 6.5 wt. %, or ≥ about 7.0 wt. %, or ≥ about 8.0 wt. %, or ≥ about 9.0 wt. %, or ≥ about 9.5 wt. %, or about 10.0 wt. % aluminum. Additionally or alternatively, the concentration of aluminum may be ≤ about 10.0 wt. %, e.g., ≤ about 9.0 wt. %, or ≤ about 8.0 wt. %, or ≤ about 7.0 wt. %, or ≤ about 6.5 wt. %, or ≤ about 6.0 wt. %, or ≤ about 5.5 wt. %, or ≤ about 5.0 wt. %, or ≤ about 4.0 wt. %, or ≤ about 3.0 wt. %. Ranges of the aluminum content in the second refinery process tube alloy that are expressly disclosed include combinations of any of the above-enumerated values, e.g., about 6.0 to about 10.0 wt. % aluminum, or about 6.5 to about 10.0 wt. %, or about 7.0 to about 10.0 wt. %, or about 5.0 to about 9.0 wt. %, or about 5.5 to about 8.0 wt. %, or about 6.0 to about 8.0 wt. %, or about 5.0 to about 8.0 wt. %, or about 6.0 to about 6.5 wt. % aluminum. Surprisingly, it has been found that the aluminum-containing refinery process tube alloys used to form the mixing element form a sufficient metallurgical bond to the inner surface of the tubular member.

It was expected that a substantially uniform coating of the second refinery process tube alloy would be needed on the inner surface of the tubular member to prevent coating delamination. Those skilled in the art will appreciate that, e.g., imbalances in cohesive and adhesive forces, introduce significant complexities when metallurgically bonding one aluminum-containing alloy to another aluminum-containing alloy. Moreover, dissimilar alloys in contact at an interface, e.g., an aluminum-containing alloy in contact with a second alloy containing aluminum but in a lesser amount, generally exhibit incompatibilities which can limit the ability of the first alloy (e.g., a surface alloy) to "wet" the second alloy (e.g., a substrate alloy). This effect generally manifests itself as an increase in contact angle (also called an internal contact angle increase), e.g., to a value ≥90° at the perimeter of the surface layer. The increase in internal contact angle arises from the balance of internal energy densities when the surface layer is applied as a liquid to the substrate, and the surface layer is then solidified. A surface alloy is "wetting" when the contact angle is less than 90°, and non-wetting when the contact angle is greater than or equal to 90°. Generally, increasing compositional dissimilarities between the surface and substrate alloys leads to a decrease in wetting and an increased tendency toward coating delamination. In other words, there is a greater tendency toward coating delamination as contact angle increases. The tendency toward delamination can be lessened, even for a non-wetting alloy surface solidified on a substrate of a dissimilar alloy, when the surface alloy is in the form of a substantially-uniform coating on a substantially-continuous internal surface of the substrate. An example of this is a substantially-uniform coating on the internal surface of a tube. In such cases, there is no contact angle because the surface alloy-substrate alloy surface tension is symmetrically distributed (e.g., balanced) over the entire internal surface of the tubular substrate. Surprisingly, it has been found that aluminum-containing alloys possess satisfactory metallurgical bonding to a variety of alloys with a variety of refinery process tube alloys without the need for the mixing element being a substantially-continuous coating on the inner surface of the tubular member. The aluminum-containing alloy used in the mixing element surprisingly adheres to the underlying alloys despite the absence of the substantially uniform surface forces which serve to prevent coating delamination. It is even more surprising that sufficient metallurgical bonding occurs between tubular members alloy comprising aluminum and mixing elements formed from an alloy having a different aluminum concentration from the tubular member, particularly where the aluminum concentration of the alloy from which the mixing element is formed has a greater concentration of aluminum than the alloy from which the tubular member is formed.

Accordingly, in certain aspects the amounts of aluminum in the first (A1) and second (A2) refinery process tube alloys may be essentially equal. In other aspects, the concentrations of aluminum in the second refinery process tube alloy and the first refinery process tube alloy may differ by ≥ about 1.0 wt. %, e.g., ≥ about 2.0 wt. %, or ≥ about 3.0 wt. %, or ≥ about 4.0 wt. %, or ≥ about 5.0 wt. %, or ≥ about 6.0 wt. %, or ≥ about 7.0 wt. %. In particular aspects, the aluminum concentration of the second refinery process tube alloy differs from that of the first steam cracker alloy by about 1.0 to about 5.0 wt. %, or about 1.0 to about 4.0 wt. %, or about 1.0 to about 3.5 wt. %, or about 1.0 to about 3.0 wt. %, or about 1.0 to about 2.5 wt. %, or about 1.0 to about 2.0 wt. %, or about 1.0 to about 1.5 wt. %. While any first and second refinery process tube alloys meeting these conditions may be used, the second refinery process tube alloy typically has a higher concentration of aluminum than does the first refinery process tube alloy. It is observed that improved adherence of the mixing element to the internal surface of the tubular member is achieved, particularly for a weldment utilized as a refinery process tube operating under refinery process conditions dealing with gas phase hydrocarbon process steams including hydrocarbon conversion processes, when the aluminum content of the second refinery process tube alloy is greater than that of the first refinery process tube alloy, i.e., A2≥A1, such as when A2 minus A1 is ≥0.5 wt. %, or A2 minus A1 is ≥1.0 wt. %.

While any second refinery process tube alloy having an aluminum concentration described above may be used, exemplary second refinery process tube alloy compositions will now be described in more detail, including second refinery process tube alloys which in addition to the specified range of aluminum content optionally further comprise one or more of chromium, nickel, iron, carbon, manganese, titanium, zirconium, hafnium, vanadium, niobium, tantalum, molybdenum, tungsten, gallium, germanium, arsenic, indium, tin, antimony, lead, palladium, platinum, copper, silver, gold, scandium, lanthanum, yttrium, and cerium.

The second refinery process tube alloy can further comprise chromium, e.g., ≥ about 15.0 wt. % chromium, such as ≥ about 18.0 wt. %, or ≥ about 20.0 wt. %, or ≥ about 22.0 wt. %, or ≥ about 25.0 wt. %, or ≥ about 30.0 wt. %. Additionally or alternatively, the second refinery process tube alloy may comprise chromium in an amount of ≤ about 30.0 wt. %, e.g., ≤ about 25.0 wt. %, or ≤ about 24.0 wt. %, or ≤ about 22.5 wt. %, or ≤ about 20.0 wt. %, or ≤ about 18.0 wt. %. Ranges of the chromium content in the second refinery process tube alloy that are expressly disclosed include combinations of any of the above-enumerated values, e.g., about 15.0 to about 30.0 wt. % chromium, or about 18 to about 30.0 wt. %, or about 20.0 to about 30.0 wt. %, or about 22.0 to about 30.0 wt. %, or about 25.0 to about 30.0 wt. %, 18.0 to about 25.0 wt. %, 18.0 to 25.0 wt. %, or 19.0 to 24.0 wt. %, or 20.0 to 22.5 wt % chromium, etc.

The second refinery process tube alloys can further comprise nickel, e.g., ≥ about 20.0 wt. % nickel, such as ≥ about 25.0 wt. %, or ≥ about 30.0 wt. %, or ≥ about 35.0 wt. %, or ≥ about 40.0 wt. % nickel. Additionally or alternatively, the amount of nickel in exemplary second refinery process tube alloy may be ≤ about 45.0 wt. %, e.g., ≤ about 40.0 wt. %, or ≤ about 35.0 wt. %, or ≤ about 30.0 wt. %, or ≤ about 25.0 wt %. Ranges of the nickel content in the second refinery process tube alloy that are expressly disclosed include combinations of any of the above-enumerated values, e.g., about 20.0 to about 45.0 wt. %, or about 25.0 to about 45.0 wt. %, or about 30.0 to about 45.0 wt. %, or about 35.0 to about 45.0 wt. %, or about 40.0 to about 45.0 wt %, etc.

The second refinery process tube alloys can further comprise iron, e.g., ≥ about 35.0 wt. % iron, such as ≥ about 40.0 wt. %, or ≥ about 45.0 wt. %, or ≥ about 50.0 wt. %, or ≥ about 55.0 wt. % iron. Additionally or alternatively, the second refinery process tube alloy may comprise ≤ about 55.0 wt. %, e.g., ≤ about 50.0 wt. %, or ≤ about 45.0 wt. %, or ≤ about 45.0 wt. % iron. Ranges of the iron content in the second refinery process tube alloy that are expressly disclosed include combinations of any of the above-enumerated values, e.g., about 35.0 to about 55.0 wt. %, or about 40.0 to about 55.0 wt. %, or about 45.0 to about 55.0 wt. %, or about 50.0 to about 55.0 wt. %, or about 35.0 to about 40 wt. % iron, etc.

The second refinery process tube alloy can further comprise silicon, e.g., ≤0.50 wt. % silicon, such as ≤ about 0.45 wt. %, or ≤ about 0.40 wt. %, or ≤ about 0.35 wt. %, or ≤ about 0.30 wt. %, or ≤ about 0.25 wt. %, or ≤ about 0.20 wt. %, or ≤ about 0.10 wt. %, or about 0 wt. %. Additionally or alternatively, silicon may be present in an amount ≥ about 0 wt. %, e.g., ≥ about 0.10 wt. %, ≥ about 0.20 wt. %, or ≥ about 0.25 wt. %, or ≥ about 0.30 wt. %, or ≥ about 0.35 wt. %, or ≥ about 0.40 wt. %, or ≥ about 0.45 wt. %. Exemplary ranges of the silicon content in the second refinery process tube alloy expressly disclosed include combinations of any of the above-enumerated values, e.g., about 0 to about 0.50 wt. % silicon, or about 0.10 to about 0.45 wt. %, or about 0.20 to about 0.40 wt. %, or about 0.25 to about 0.35 wt. % silicon, etc.

Carbon is typically, although not necessarily, present in the second refinery process tube alloy. For example in particular second refinery process tube alloys carbon may be present in an amount ≤ about 0.1 wt. % carbon, e.g., ≤0.08 wt. %, or ≤ about 0.05 wt. % carbon. Additionally or alternatively, carbon may be present in an amount ≥ about 0 wt. %, e.g., ≥ about 0.02 wt. %, such as ≥ about 0.05 wt. %, or ≥ about 0.07 wt. %, or ≥ about 0.09 wt. %. Exemplary ranges of the carbon content in the second refinery process tube alloy expressly disclosed include combinations of any of the above-enumerated values, e.g., 0 to about 0.10 wt. % carbon, or about 0.02 to about 0.08 wt. %, or about 0.05 to about 0.08 wt. %, or about 0.09 to about 0.10 wt. % carbon, etc. Carbon may be present in the second refinery process tube alloy as a form of carbide precipitates, which are believed to contribute to improved creep strength when it is exposed to high temperatures for extended periods of time.

The second refinery process tube alloy may further include 0.01 to 4.0 wt. %, e.g., 0.03 to about 3.7 wt. %, or about 0.05 to about 3.5 wt. %, or about 0.07 to about 3.3 wt. %, or about 1.0 to about 3.0 wt. %, or about 1.3 to about 2.7 wt. %, or about 1.5 to about 2.5 wt. %, or about 1.7 to about 2.3, or about 2.0 wt. %, of at least one element chosen from manganese, titanium, zirconium, hafnium, vanadium, niobium, tantalum, molybdenum, tungsten, and combinations thereof. The total amount of this group of elements in the second refinery process tube alloy is generally ≤ about 4.0 wt. %, e.g. ≤ about 2.0 wt. %, or ≤ about 1.0 wt. %, or about 0 wt. %.

Alloying elements, such as for example, gallium, germanium, arsenic, indium, tin, antimony, lead, palladium, platinum, copper, silver and gold, are believed to inhibit coking formation because these elements are noncatalytic to surface carbon transfer reaction. Alloying elements, such as for example, rhenium, ruthenium, rhodium, iridium, palladium, platinum, copper, silver and gold, may provide increased coating integrity, stability and durability and/or lower the defect concentration in the second refinery process tube alloy. Thus, the second refinery process tube alloy may include about 0.10 to about 2.0 wt. %, e.g., about 0.5 to about 1.5 wt. %, or about 0.75 to about 1.25 wt. %, or about 1.00 wt. % of at least one element selected gallium, germanium, arsenic, indium, tin, antimony, lead, palladium, platinum, copper, silver and gold and combinations thereof. The total amount of this group of elements in the second refinery process tube alloy is generally ≤ about 3.0 wt. %, e.g. ≤ about 2.0 wt. %, or ≤ about 1.0 wt. %, or about 0 wt. %. Additionally or alternatively, the second refinery process tube alloy may include 0.1 wt. % to 2.0 wt. %, e.g., about 0.5 to about 1.5 wt. %, or about 0.75 to about 1.25 wt. %, or about 1 wt. % of at least one element chosen from rhenium, ruthenium, rhodium, iridium, palladium, platinum, copper, silver and gold. The total amount of this group of elements in the second refinery process tube alloy is generally ≤ about 3.0 wt. %, e.g. ≤ about 2.0 wt. %, or ≤ about 1.0 wt. %, or about 0 wt. %.

The second refinery process tube alloy may further include at least one element chosen from scandium, lanthanum, yttrium, and cerium in an amount ≥ about 0.10 wt. %, e.g., ≥ about 0.30 wt. %, such as ≥ about 0.50 wt. %, or ≥ about 0.70 wt. %, or ≥ about 1.0 wt. %, or ≥ about 1.30 wt. %, or ≥ about 1.50 wt. %, or ≥ about 1.70 wt. %, Additionally or alternatively, at least one of scandium, lanthanum, yttrium, and cerium may be present in an amount ≤ about 2.0 wt. %, e.g., ≤ about 1.70 wt. %, or ≤ about 1.50 wt. %, or ≤ about 1.30 wt. %, or ≤ about 1.00 wt. %, or ≤ about 0.70 wt. %, or ≤ about 0.50 wt. %, or ≤ about 0.30 wt. %. Exemplary content ranges in the second refinery process tube alloy expressly disclosed include combinations of any of the above-enumerated values, e.g., about 0.01 wt. % to about 2.0 wt. %, or about 0.03 wt. % to about 1.7 wt. %, or about 0.05 wt. % to about 1.5 wt. %, or about 0.07 wt. % to about 1.3 wt. %, or about 1.0 wt. %. The total amount of this group of elements in the second refinery process tube alloy is generally ≤ about 3.0 wt. %, e.g. ≤ about 2.0 wt. %, or ≤ about 1.0 wt. %.

Any of the above enumerated elements may be present in the second refinery process tube alloy in the form of intermetallic precipitates including, but not limited to, $Ni_3Al$, NiAl, etc. in an amount of 0.1 wt. % to 30.0 wt. %. Likewise, the second refinery process tube alloy may include any of the above elements in the form of an oxide, carbide, nitride and/or carbonitride in an amount of e.g., 0.01 wt. % to 5.0 wt. %. These intermetallic precipitates and inclusions are formed particularly from the constituting elements of the second refinery process tube alloy including, but not limited to, iron, nickel, chromium, aluminum and silicon. Both intermetallic precipitates and oxide, carbide, nitride and carbonitride inclusions may provide improved high temperature creep strength.

The second refinery process tube alloy typically has a low porosity, which contributes to its improved resistance to corrosion and coking when exposed to hydrocarbon process streams in petrochemical and refining process units. The second refinery process tube alloy has e.g., ≤2.0 vol. % porosity, or ≤1.0 vol. % porosity, or ≤0.5 vol. % porosity, or ≤0.1 vol. % porosity. Excessive porosity in the second refinery process tube alloy, if present, would serve as a pathway for gaseous molecules of hydrocarbon streams in petrochemical and refining process units to undesirably transfer gaseous molecules. The transfer of gaseous molecules may contribute to corrosion deterioration of mechanical strength. Thus, it is advantageous to achieve a second refinery process tube alloy including a minimal amount of porosity.

In particular aspects, the second refinery process tube alloy comprises about 57.5 to about 59.5 wt. % nickel, or about 9.0 to about 11.0 wt. % iron, or about 5.5 to about 6.5 wt. % aluminum, about 24.0 to about 26.0 wt. % chromium, and about 0.3 to about 0.7 wt. % yttrium.

In other aspects, the second refinery process tube alloy includes about 32.3 to about 37.7 wt. % nickel, about 33.5 to about 35.5 wt. % iron, about 4.5 to about 5.5 wt. % aluminum, about 24.0 to about 26.0 wt. % chromium, and about 0.3 to about 0.7 wt. % yttrium.

In still other aspects, the second refinery process tube alloy includes about 57.5 to about 59.5 wt. % nickel, about 9.0 to about 11.0 wt. % iron, about 5.5 to about 6.5 wt. % aluminum, about 24.o to about 26.0 wt. % chromium, and 0.3 to about 0.7 wt. % $Y_2O_3$.

In still other aspects, the second refinery process tube alloy includes about 34.0 to about 36.0 wt. % nickel, about 33.5 to about 35.5 wt. % iron, about 4.5 to about 5.5 wt. % aluminum, about 24.o to about 26.0 wt. % chromium, and about 0.3 to about 0.7 wt. % $Y_2O_3$.

In yet other aspects, the second refinery process tube alloy includes about 30.5 to about 36.0 wt. % nickel, e.g. 33.0 to 35.0 wt. % nickel; about 20.0 to about 22.0 wt. % chromium; about 6.1 to about 6.5 wt. % aluminum; about 37.7 to about 39.7 wt. % iron; and about 0.37 to about 0.45 wt. % silicon.

In yet another aspect, the second refinery process tube alloy includes about 31.0 to about 36.0 wt. % nickel, e.g. about 32.0 to about 34.0 wt. % nickel; about 20.0 to about 22.0 wt. % chromium; about 6.1 to about 6.4 wt. % aluminum; about 37.9 to about 39.9 wt. % iron; and about 0.40 to about 0.45 wt. % silicon.

In yet another advantageous aspect, the second refinery process tube alloy includes about 33.0 to about 36.0 wt. % nickel, about 21.7 to about 22.5 wt. % chromium, about 6.7 to about 7.1 wt. % aluminum, about 35.9 to about 36.7 wt. % iron, about 0.16 to about 0.24 wt. % silicon.

In yet another advantageous aspect, the second refinery process tube alloy includes about 33.0 to about 36.0 wt. % nickel, about 21.7 to about 22.5 wt. % chromium, about 6.7 to about 7.1 wt. % aluminum, about 35.9 to about 36.7 wt. % iron, about 0.16 to about 0.24 wt. % silicon.

In some aspects, the second refinery process tube alloy includes about 26.0 to about 39.0 wt. % nickel, about 20.0 to about 22.5 wt. % chromium, about 6.0 to about 8.0 wt. % aluminum, about 35.0 to 40.0 wt. % iron, and ≤ about 0.45 wt. % silicon.

In still further aspects, the second refinery process tube alloy includes about 31.0 to about 37.0 wt. % nickel, about 20.0 to about 22.0 wt. % chromium, about 6.0 to 6.5 wt. % aluminum, about 37.0 to 40.0 wt. % iron, and ≤0.45 wt. % silicon.

In yet other aspects, the second refinery process tube alloy includes about 28.5 to about 40.0 wt. % nickel, about 19.0 to about 24.0 wt. % chromium, about 5.0 to about 7.0 wt. % aluminum, about 35.0 to about 40.0 wt. % iron, and ≤ about 0.3 wt. % silicon.

Other alloys suitable as second refinery process tube alloys are described in U.S. Patent Application Pub. No. 2012/0097289, incorporated herein by reference in its entirety. When a plurality of the mixing elements is present in the weldment, each of the mixing elements can comprise substantially the same second refinery process tube alloy, but this is not required. In other aspects, the weldment includes a plurality of mixing elements, with at least one mixing element among the plurality having a substantially different composition than the other(s). The mixing element(s) of different composition can include a different second refinery process tube alloy, e.g., an alternative second refinery process tube alloy that is selected from among the specified second refinery process tube alloys. So long as at least one of the plurality of mixing elements comprises at least one of the specified second refinery process tube alloys, the remaining mixing elements of the weldment can comprise alloys that are not among those specified as second refinery process tube alloys. For example, the weldment can comprise (ii) at least one first mixing element comprising one or more of the specified second refinery process tube alloys and (ii) at least one second mixing element, the second mixing element comprising an alloy that is not among the specified second refinery process tube alloys (e.g., an alloy that does not contain aluminum). For greatest corrosion resistance, it is preferred that each of the plurality of mixing elements comprise at least one of the specified second refinery process tube alloys.

Corrosion-Resistant Layer

The weldments described herein include a protective layer (e.g., a scale) in the weldment's internal channel. The protective layer, referred to herein as a corrosion-resistant layer, lessens the weldment's tendency toward corrosion, which includes but is not limited to metal dusting, carburization, sulfidation, and coking, in refinery process conditions dealing with gas phase hydrocarbon process steams including hydrocarbon conversion processes, particularly proximate to (i) the first tubular member's inner surface and (ii) the mixing element's surface. The term "corrosion-resistant" in this context means that the carbon content of the corrosion-resistant layer has a carbon content that is less than that of the first or second refinery process tube alloy, whichever is higher, after exposing the inner surface of the first tubular member and mixing element for at least 24 hours to at least one of the specified hydrocarbon feeds under refinery process conditions dealing with gas phase hydrocarbon process steams including hydrocarbon conversion processes which include a temperature ≥350° C. and a pressure ≥2 bar. Although the corrosion-resistant layer can be formed when the weldment is manufactured, it is typically formed when the weldment is utilized in in refinery process conditions dealing with gas phase hydrocarbon process steams including hydrocarbon conversion processes, e.g., in syngas generation service, e.g., as a gas-gas heat exchanger tubes in syngas generation service.

The corrosion-resistant layer comprises alumina and typically forms over (i) at least a portion, e.g., ≥90 area %, such as or ≥95 area %, or ≥99 area %, or ≥99.9 area %, substantially all, essentially all, or 100 area % of the exposed inner surface of the first tubular member and (ii) the exposed surfaces of the mixing element. In some aspects, the corrosion-resistant layer may be described as substantially free of chromium, particularly a layer that is substantially free of chromium carbide. In other aspects, chromium-containing particles may be dispersed in the portion of the corrosion-resistant layer adjacent alloy of the first tubular member and/or the at least on mixing element. The chromium concentration in this region may be higher than that of the alloy over which the corrosion-resistant layer forms. In particular aspects, the corrosion-resistant layer comprises $Al_2O_3$, e.g., 70 to 100 wt. % $Al_2O_3$, 80 to 100 wt. % $Al_2O_3$, or 85 to 99 wt. % $Al_2O_3$.

So long as the corrosion-resistant layer is sufficiently thick so as to lessen the amount of corrosion during hydrocarbon conversion processes, the corrosion-resistant layer's thickness is not particularly critical. In some exemplary aspects the corrosion layer may be ≥1.0 nm, e.g., ≥ about 5.0 nm, such as ≥ about 10.0 nm, or ≥ about 25.0 nm, or ≥ about 50.0 nm, or ≥ about 100.0 nm, or ≥ about 1.0 μm, or ≥ about 5.0 μm, or ≥ about 7.5 nm. Additionally or alternatively, the thickness of the corrosion-resistant layer may be ≤ about 10.0 μm, e.g., ≤ about 7.5 μm, or ≤ about 5.0 μm, or ≤ about 1.0 μm, or ≤ about 100.0 nm, or ≤ about 50.0 nm, or ≤ about 25.0 nm, or ≤ about 10.0 nm, or ≤ about 5.0 nm. Exemplary ranges of the corrosion-resistant layer include combinations of any of the above-enumerated values, e.g., 1.0 nm to 100.0 μm, or from 10.0 nm to 50.0 μm, or 100.0 nm to 10.0 μm. Optionally, the corrosion-resistant layer is of substantially uniform thickness, but this is not required. In certain aspects the thickness of that portion of the corrosion-resistant layer located on the mixing element is thicker than the portion located on the remainder of the tubular member's inner surface. Alternatively, or in addition, the thickness of the weldment's corrosion-resistant layer proximate to the tubular member's outlet can be greater than the thickness proximate to the tubular member's inlet, or vice-versa. In other aspects, the corrosion-resistant layer's thickness is greatest at a location between the tubular member's inlet and outlet.

In certain aspects, the corrosion-resistant layer may be formed by exposing the weldment to a controlled low oxygen partial pressure environment, including gaseous environments having thermodynamic oxygen partial pressures less than that of air. Non-limiting examples of a controlled low oxygen partial pressure environment are a refinery or petrochemical plant steam, gaseous $H_2O:H_2$ mixture and a gaseous $CO_2:CO$ mixture. The controlled low oxygen partial pressure environment may further contain other gases such as $CH_4$, $N_2$, $O_2$, He, Ar and hydrocarbons, which may further enable formation of corrosion-resistant layer. Therefore, the corrosion-resistant layer may be formed prior to exposure of the weldment to refinery process conditions dealing with gas phase hydrocarbon process steams including hydrocarbon conversion processes. Suitable temperatures for the controlled low oxygen partial pressure environment are typically ≥ about 500° C., e.g., 500° C. to 1200° C., or from 600° C. to 1100° C. Exposure times are typically ≥ about 1 hour, e.g., 1 hour to 500 hours, or from 1 hour to 300 hours, or from 1 hour to 100 hours.

The foregoing corrosion-resistant layer may alternatively be formed by machining the inner surface of first tubular member and the surfaces of the at least one mixing element to a surface roughness (Ra) of 0.05 to 2.5 and thereafter heat-treating the interior of the weldment in an oxidizing atmosphere of at least 1050° C. In the case where this heat treatment is conducted at a temperature of below 1050° C. (but not lower than 900° C.), the lower limit for the rare earth elements in the first and second refinery process tube alloys should be 0.06 wt. %, with the upper limit for tungsten set at 6 wt. %.

In aspects where the corrosion-resistant layer is formed by heat treatment, e.g., by exposing the mixing element and/or inner surface of the tubular member to a temperature of at least 1050° C. in an oxidizing atmosphere, the formation of Al₂O₃ in the corrosion-resistant layer is facilitated by a rare earth element concentration of ≥0.005 wt. %.

Optional Second Tubular Member

Weldments according to aspects of the disclosure described herein optionally include an outer tubular member in surface contact with the outer surface of the first tubular member. The second tubular member is particularly useful where the ductility of the first tubular member is undesirably low. The second tubular member may be included in the weldment as disclosed in U.S. Patent App. Pub. No. 2012/0097289. Optionally, the first tubular member is in the form of a coating on the inner surface of the second tubular member. The second tubular member comprises at least one third refinery process tube alloy, the third refinery process tube alloy typically having greater ductility than does the first refinery process tube alloy. The third refinery process tube alloy typically contains less aluminum on a weight basis compared to the first refinery process tube alloy. Optionally, the third refinery process tube alloy is essentially-free of aluminum, meaning that aluminum is present at a concentration indicative of impurities, e.g., ≤ about 0.2 wt. %, or ≤ about 0.1 wt. %, or ≤ about 0.05 wt. %, or ≤ about 0.03 wt. %, or ≤ about 0.02 wt. %, or ≤ about 0.01 wt. %, or at an undetectable amount.

Suitable third refinery process tube alloys include those comprising at least 18.0 wt. % Cr and 10.0 wt. % Ni, and advantageously at least 20.0 wt. % Cr and 30.0 wt. % Ni. Non-limiting examples of such an alloy include HP45Nb, HP16Nb, HN10NiNh, HP 40 Mod, Pompey HP 40W, Pompey Manaurite XM, Manaurite XTM, and Kubota KHR 45A. Table 5 lists certain alloys that are suitable for use as third steam cracker alloy.

employed in determining the surface roughness in accordance with the present disclosure.

PCT/EP Clauses:

1. A weldment suitable for use in refinery processes dealing with gas phase hydrocarbon process streams at high temperatures, the weldment comprising:
    a) a first tubular member comprising a first refinery process tube alloy and having inner and outer surfaces; and
    b) one or more mixing elements in surface contact with the inner surface of the first tubular member, at least one of the mixing elements comprising a second refinery process tube alloy, wherein;
        (i) the first refinery process tube alloy comprises A1 wt. % aluminum, based on the weight of the first refinery process tube alloy,
        (ii) the second refinery process tube alloy comprises A2 wt. % aluminum, based on the weight of the second refinery process tube alloy, and
        (iii) A1 is greater than or equal to 2.0 wt. % and A2 is greater than or equal to 2.0 wt. %.
2. The weldment of clause 1, wherein A1 is in the range of from 2.0 wt. % to 10.0 wt. % and A2 is in the range of from 2.0 wt. % to 10.0 wt. %.
3. The weldment of clauses 1 or 2, wherein A2 is greater than or equal to A1.
4. The weldment of any of clauses 1 to 3, wherein A2 minus A1 is greater than or equal to 0.5 wt. %.
5. The weldment of any of clauses 1 to 4, wherein A2 minus A1 is greater than or equal to 1.0 wt. %.
6. The weldment of any of clauses 1 to 5, wherein A1 is in the range of from 2.0 wt. % to 4.0 wt. %.
7. The weldment of any of clauses 1 to 6, wherein A2 is in the range of from 5.0 wt. % to 8.0 wt. %.

TABLE 5

Exemplary Non-Al-Containing Third Refinery Process Tube Alloys

| Ex | C | Si | Mn | Cr | Ni | W | Mo | Zr | Nb | P | S | Fe |
|---|---|---|---|---|---|---|---|---|---|---|---|---|
| 1 | 0.09-0.12 | 0.8-1.3 | 1.3-1.6 | 18-23 | 31-34 | | ≤0.2 | 0.23 | 0.8-1.0 | ≤0.02 | ≤0.02 | 38-48 |
| 2 | 0.37-0.45 | 1.5-2.0 | | 23-26 | 34-37 | trace | ≤1.25 | | Tr | | | 33-41 |
| 3 | 0.37-0.50 | 1.5-2.0 | | 24-27 | 33-37 | 3.8-5 | ≤1.5 | | | | | 27-37 |
| 4 | 0.37-0.50 | 1.0-2.0 | | 23-28 | 33-38 | | 1.0-1.5 | Tr | Tr | | | 30-42 |
| 5 | 0.40-0.45 | 1.0-2.0 | | 34-37 | 43-48 | | 1.0-2.0 | | Tr | | | 10-21 |
| 6 | | ≤2.0 | ≤2.0 | 30-35 | 40-46 | | | | Tr | | | 15-30 |
| 7 | 0.4-0.5 | 1.2-1.8 | 1.2-1.7 | 23-27 | 33-38 | | ≤0.2 | | 0.6-1.6 | ≤0.02 | ≤0.02 | 29-41 |
| 8 | 0.14-0.18 | 1.2-1.8 | 1.2-1.6 | 22-26 | 35-37 | | ≤0.2 | | | ≤0.02 | ≤0.02 | 33-41 |

Test Methods

Chemical composition may be determined by electron probe micro-analyzer (EPMA). EPMA is fundamentally the same as scanning electron microscopy (SEM) with the added capability of chemical analysis. The primary importance of EPMA is the ability to acquire precise, quantitative elemental analyses by wavelength dispersive spectroscopy (WDS). The spatial scale of analysis, combined with the ability to create detailed images of the sample, makes it possible to analyze materials in situ and to resolve complex chemical variation within single phases.

Roughness is routinely expressed as the arithmetic average roughness (Ra). The arithmetic average height of roughness component of irregularities from the mean line is measured within the sample length L. The standard cut-off is 0.8 mm with a measuring length of 4.8 mm. This measurement conforms to ANSI/ASME B46.1 "Surface Texture—Surface Roughness, Waviness and Lay", which was 8. The weldment of any of clauses 1 to 7, further comprising a second tubular member in surface contact with the outer surface of the first tubular member.
9. The weldment of any of clauses 1 to 8, further comprising a corrosion-resistant layer over at least a portion of the outer tubular member surface and/or at least a portion of at least one of the mixing elements comprising the second refinery process tube alloy, wherein the corrosion-resistant layer comprises alumina.
10. The weldment of clause 9, wherein the corrosion-resistant layer is substantially free of chromium.
11. The weldment of any of clauses 1 to 10, wherein the first refinery process tube alloy further comprises less than or equal to 65.0 wt. % iron, greater than or equal to 17.5 wt. % chromium, and greater than or equal to 25.0 wt. % nickel.
12. The weldment of clause 11, wherein the first refinery process tube alloy comprises greater than or equal to 20.0 wt. % chromium and greater than or equal to 30.0 wt. % nickel.

13. The weldment of any of clauses 1 to 12, wherein the second refinery process tube alloy further comprises less than or equal to 65.0 wt. % iron, greater than or equal to 17.5 wt. % chromium, and greater than or equal to 25.0 wt. % nickel.

14. The weldment of clause 13, wherein the second refinery process tube alloy comprises 18.0 to 25.0 wt. % chromium, less than or equal to 0.5 wt. % silicon, 35.0 wt. % to 65.0 wt. % iron, and 25.0 wt. % to 55.0 wt. % nickel.

15. The weldment of any of clauses 1 to 14, wherein the second refinery process tube alloy further comprises less than or equal to 0.01 wt. % carbon.

16. The weldment of any of clauses 1 to 15, wherein the second refinery process tube alloy further comprises at least one of the following:
(i) 0.1 wt. % to 2.0 wt. % of at least one of gallium, germanium, arsenic, indium, tin, antimony, lead, palladium, platinum, copper, silver, or gold;
(ii) 0.1 wt. % to 2.0 wt. % of at least one of rhenium, ruthenium, rhodium, or iridium;
(iii) 0.01 to 2.0 wt. % of at least one of scandium, lanthanum, yttrium, or cerium; and
(iv) 0.01 to 4.0 wt. % of at least one of manganese, titanium, zirconium, hafnium, vanadium, niobium, tantalum, molybdenum, or tungsten.

17. The weldment of clause 16, wherein 0.01 to 2.0 wt. % of the second refinery process tube alloy is in the form of one or more particulate oxides.

18. The weldment of any of clauses 1 to 17, wherein (i) at least a portion of the second refinery process tube alloy's aluminum is in the form of $Ni_3Al$ intermetallic precipitate or NiAl intermetallic precipitate and (ii) the total $Ni_3Al$ intermetallic precipitate and NiAl intermetallic precipitate are present in a total amount ($Ni_3Al$ intermetallic precipitate+NiAl intermetallic precipitate) in the range of 0.1 wt. % to 30.0 wt. %, based on the weight of the second refinery process tube alloy.

19. The weldment of any of clauses 1 to 18, wherein 0.01 wt. % to 5.0 wt. % of the second refinery process tube alloy is in the form of oxide inclusions, carbide inclusions, nitride inclusions, carbonitride inclusions, or combinations thereof.

20. The weldment of any of clauses 1 to 19, wherein among the mixing elements which comprise the second refinery process tube alloy is at least one of the following:
(i) in the form of a protrusion from the inner surface of the first tubular member and
(ii) configured to agitate a flow of hydrocarbon passing through the tubular member to distribute the hydrocarbon flow across a transverse internal cross section of the first tubular member to create a generally uniform temperature profile across the transverse internal cross section.

21. The weldment of any of clauses 1 to 19, wherein (i) among the mixing elements which comprise the second refinery process tube alloy is at least one that is in the form of a fin, (ii) the fin projects in a direction substantially intersecting a longitudinal axis of the first tubular member, and (iii) the fin is configured to deflect of a flow of hydrocarbon passing through the tubular member to distribute the hydrocarbon flow across a transverse internal cross section of the first tubular member to create a generally uniform temperature profile across the transverse internal cross section.

22 The weldment of any of clauses 1 to 19, wherein among the mixing elements which comprise the second refinery process tube alloy is at least one that is in the form of a discontinuous and/or helical weld bead.

23. A heat transfer tube for use in refinery processes dealing with gas phase hydrocarbon process streams at high temperatures, the heat transfer tube comprising: a weldment according to any of clauses 1 to 22.

24. A refinery process dealing with gas phase hydrocarbon process streams at high temperatures comprising at least one heat transfer tube, the heat transfer tube comprising a weldment according to any of clauses 1 to 23.

While the illustrative embodiments of the disclosure have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside in the disclosure, including all features which would be treated as equivalents thereof by those skilled in the art to which the disclosure pertains.

All documents described herein are incorporated by reference herein for purposes of all jurisdictions where such practice is allowed, including any priority documents and/or testing procedures to the extent they are not inconsistent with this text, provided however that any priority document not named in the initially filed application or filing documents is NOT incorporated by reference herein.

As is apparent from the foregoing general description and the specific embodiments, while forms of the disclosure have been illustrated and described, various modifications can be made without departing from the spirit and scope of the disclosure. Accordingly, it is not intended that the disclosure be limited thereby. Unless otherwise stated, all percentages, parts, ratios, etc. are by weight. Unless otherwise stated, a reference to a compound or component includes the compound or component by itself, as well as in combination with other compounds or components, such as mixtures of compounds. Likewise, the term "comprising" is considered synonymous with the term "including". Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa. Aspects of the disclosure include those that are substantially free of, essentially free of, or completely free of any element, step, composition, ingredient or other claim element not expressly recited or described.

What is claimed is:

1. A weldment suitable for use in refinery processes dealing with gas phase hydrocarbon process streams at high temperatures, the weldment comprising:
   a) a first tubular member comprising a first refinery process tube alloy and having inner and outer surfaces; and
   b) one or more mixing elements in surface contact with the inner surface of the first tubular member, at least one of the mixing elements comprising a second refinery process tube alloy, wherein;
   (i) the first refinery process tube alloy comprises A1 wt. % aluminum, based on the weight of the first refinery process tube alloy,
   (ii) the second refinery process tube alloy comprises A2 wt. % aluminum, based on the weight of the second refinery process tube alloy, and (iii) A1 is greater than or equal to 2.0 wt. % and A2 is greater than or equal to 2.0 wt. %.

2. The weldment of claim 1, wherein A1 is in the range of from 2.0 wt. % to 10.0 wt. % and A2 is in the range of from 2.0 wt. % to 10.0 wt. %.

3. The weldment of claim 1, wherein A2 is greater than or equal to A1.

4. The weldment of claim 1, wherein A2 minus A1 is greater than or equal to 0.5 wt. %.

5. The weldment of claim 4, wherein A2 minus A1 is greater than or equal to 1.0 wt. %.

6. The weldment of claim 1, wherein A1 is in the range of from 2.0 wt. % to 4.0 wt. %.

7. The weldment of claim 1, wherein A2 is in the range of from 5.0 wt. % to 8.0 wt. %.

8. The weldment of claim 1 further comprising a second tubular member in surface contact with the outer surface of the first tubular member.

9. The weldment of claim 1 further comprising a corrosion-resistant layer over at least a portion of the outer tubular member surface and/or at least a portion of at least one of the mixing elements comprising the second refinery process tube alloy, wherein the corrosion-resistant layer comprises alumina.

10. The weldment of claim 9, wherein the corrosion-resistant layer is substantially free of chromium.

11. The weldment of claim 1, wherein the first refinery process tube alloy further comprises less than or equal to 65.0 wt. % iron, greater than or equal to 17.5 wt. % chromium, and greater than or equal to 25.0 wt. % nickel.

12. The weldment of claim 11, wherein the first refinery process tube alloy comprises greater than or equal to 20.0 wt. % chromium and greater than or equal to 30.0 wt. % nickel.

13. The weldment of claim 1, wherein the second refinery process tube alloy further comprises less than or equal to 65.0 wt. % iron, greater than or equal to 17.5 wt. % chromium, and greater than or equal to 25.0 wt. % nickel.

14. The weldment of claim 13, wherein the second refinery process tube alloy comprises 18.0 to 25.0 wt. % chromium, less than or equal to 0.5 wt. % silicon, 35.0 wt. % to 65.0 wt. % iron, and 25.0 wt. % to 55.0 wt. % nickel.

15. The weldment of claim 1, wherein the second refinery process tube alloy further comprises less than or equal to 0.01 wt. % carbon.

16. The weldment of claim 1, wherein the second refinery process tube alloy further comprises at least one of the following:
(i) 0.1 wt. % to 2.0 wt. % of at least one of gallium, germanium, arsenic, indium, tin, antimony, lead, palladium, platinum, copper, silver, or gold;
(ii) 0.1 wt. % to 2.0 wt. % of at least one of rhenium, ruthenium, rhodium, or iridium;
(iii) 0.01 to 2.0 wt. % of at least one of scandium, lanthanum, yttrium, or cerium; and
(iv) 0.01 to 4.0 wt. % of at least one of manganese, titanium, zirconium, hafnium, vanadium, niobium, tantalum, molybdenum, or tungsten.

17. The weldment of claim 16, wherein 0.01 to 2.0 wt. % of the second refinery process tube alloy is in the form of one or more particulate oxides.

18. The weldment of claim 1, wherein (i) at least a portion of the second refinery process tube alloy's aluminum is in the form of $Ni_3Al$ intermetallic precipitate or NiAl intermetallic precipitate and (ii) the total $Ni_3Al$ intermetallic precipitate and NiAl intermetallic precipitate are present in a total amount ($Ni_3Al$ intermetallic precipitate+NiAl intermetallic precipitate) in the range of 0.1 wt. % to 30.0 wt. %, based on the weight of the second refinery process tube alloy.

19. The weldment of claim 1, wherein 0.01 wt. % to 5.0 wt. % of the second refinery process tube alloy is in the form of oxide inclusions, carbide inclusions, nitride inclusions, carbonitride inclusions, or combinations thereof.

20. The weldment of claim 1, wherein among the mixing elements which comprise the second refinery process tube alloy is at least one of the following:
(i) in the form of a protrusion from the inner surface of the first tubular member and
(ii) configured to agitate a flow of hydrocarbon passing through the tubular member to distribute the hydrocarbon flow across a transverse internal cross section of the first tubular member to create a generally uniform temperature profile across the transverse internal cross section.

21. The weldment of claim 1, wherein (i) among the mixing elements which comprise the second refinery process tube alloy is at least one that is in the form of a fin, (ii) the fin projects in a direction substantially intersecting a longitudinal axis of the first tubular member, and (iii) the fin is configured to deflect of a flow of hydrocarbon passing through the tubular member to distribute the hydrocarbon flow across a transverse internal cross section of the first tubular member to create a generally uniform temperature profile across the transverse internal cross section.

22. The weldment of claim 1, wherein among the mixing elements which comprise the second refinery process tube alloy is at least one that is in the form of a discontinuous and/or helical weld bead.

23. A heat transfer tube for use in refinery processes dealing with gas phase hydrocarbon process streams at high temperatures, the heat transfer tube comprising: a weldment according to claim 1.

* * * * *